US011919672B2

(12) United States Patent
Uschold et al.

(10) Patent No.: US 11,919,672 B2
(45) Date of Patent: Mar. 5, 2024

(54) APPARATUS AND METHODS FOR FASTENING AN ELEMENT TO A SUPPORT STRUCTURE

(71) Applicant: Avery Dennison Corporation, Glendale, CA (US)

(72) Inventors: Robert C. Uschold, Leominster, MA (US); Soniya Soniya, Dubai (AE)

(73) Assignee: Avery Dennison Corporation, Glendale, CA (US)

( * ) Notice: Subject to any disclaimer, the term of this patent is extended or adjusted under 35 U.S.C. 154(b) by 260 days.

(21) Appl. No.: 17/601,719

(22) PCT Filed: Apr. 8, 2020

(86) PCT No.: PCT/US2020/027185
§ 371 (c)(1),
(2) Date: Oct. 6, 2021

(87) PCT Pub. No.: WO2020/210297
PCT Pub. Date: Oct. 15, 2020

(65) Prior Publication Data

US 2022/0169411 A1 Jun. 2, 2022

Related U.S. Application Data

(60) Provisional application No. 62/939,859, filed on Nov. 25, 2019, provisional application No. 62/833,434, filed on Apr. 12, 2019.

(51) Int. Cl.
*B65C 7/00* (2006.01)
*A41H 37/00* (2006.01)

(52) U.S. Cl.
CPC .......... *B65C 7/005* (2013.01); *A41H 37/008* (2013.01)

(58) Field of Classification Search
CPC .......... B65C 7/005; B65C 7/00; B65C 7/003; A41H 37/008; A41H 37/005; A41H 37/00;
(Continued)

(56) References Cited

U.S. PATENT DOCUMENTS

| | | |
|---|---|---|
| 2,257,954 A | 10/1941 | Henkels |
| 2,947,047 A | 8/1960 | Guzell |

(Continued)

FOREIGN PATENT DOCUMENTS

| | | | |
|---|---|---|---|
| CA | 33943 | 5/1971 | |
| CA | 2427834 C * | 8/2007 | ............. B65C 7/005 |

(Continued)

OTHER PUBLICATIONS

Keadic, 30Pcs M32 Two Hole Strap U Bracket Tube Strap Tension Clips Stainless Steel Heavy Duty Rigid Type Pipe Strap Clamp, Date first available Sep. 2, 2018, [online] retrieved Dec. 28, 2020, available from internet, https://www.amazon.com/Keadic-Bracket-Stainless-Surfaces-Structures/dp/B07H25JPZN/refs=s (year: 2018).

(Continued)

*Primary Examiner* — Ismael Izaguirre

(57) ABSTRACT

An apparatus can comprise a first hollow needle and a first ejector pin with a first portion of an outer peripheral surface comprising a stepped recess from the second portion of the outer peripheral surface. In some embodiments, the apparatus may further comprise a second hollow needle. In some embodiments, a first end portion of the cap can be configured for mounting to a nose of the apparatus. The cap can comprise the aperture that may be sized for insertion of the tip of the first hollow needle through the aperture when the cap is removed from the nose. In some embodiments, a nose of the apparatus can comprise a first support surface facing an outer direction and a second support surface facing the (Continued)

outer direction and protruding from the first support surface in the outer direction.

31 Claims, 17 Drawing Sheets

(58) Field of Classification Search
CPC .. A44B 1/18; A44B 1/185; A44B 1/42; A44B 1/44
See application file for complete search history.

(56) References Cited

U.S. PATENT DOCUMENTS

D200,198 S 2/1965 Vilcins
3,282,657 A 11/1966 Bright
3,338,689 A 8/1967 Hetzel et al.
3,399,432 A 9/1968 Merser
3,470,834 A 10/1969 Bone
3,494,004 A 2/1970 Bone
3,547,122 A 12/1970 Rinser
D223,138 S 3/1972 Mulholland
3,750,605 A 8/1973 Warburton et al.
D230,115 S 1/1974 Beams
3,815,798 A 6/1974 Lavitch et al.
3,875,648 A 4/1975 Bone
3,893,612 A 7/1975 Bone
3,895,753 A 7/1975 Bone
3,900,925 A 8/1975 LaTorraca
3,990,619 A 11/1976 Russell
D243,365 S 2/1977 Cross
D251,771 S 5/1979 Tritton
4,187,970 A 2/1980 Furutu
4,296,698 A 10/1981 Davidson et al.
4,333,596 A 6/1982 Kunreuther
4,417,682 A 11/1983 Furutsu
4,423,837 A 1/1984 Clements
D273,171 S 3/1984 Bone
4,455,858 A 6/1984 Hettich
4,456,162 A 6/1984 Furutsu
4,482,088 A 11/1984 Hyun
4,492,330 A 1/1985 Furutsu
4,533,076 A * 8/1985 Bourque ................. B65C 7/005 227/71
4,664,306 A 5/1987 Levy
4,682,721 A * 7/1987 Duchin ................... B65C 7/005 227/67
4,693,248 A 9/1987 Failla
4,838,469 A 6/1989 Strausburg
4,923,106 A 5/1990 Furutsu
5,020,713 A 6/1991 Kunreuther
5,074,452 A 12/1991 Bone
D327,398 S 6/1992 Meyers
D333,415 S 2/1993 Furutsu
5,188,912 A 2/1993 Katoh
5,205,458 A 4/1993 Kunreuher
5,227,178 A * 7/1993 Rieker ................ B29C 45/4005 249/68
D340,850 S 11/1993 Tang
5,305,939 A 4/1994 Deschenes et al.
5,307,975 A 5/1994 Deschenes et al.
5,383,260 A 1/1995 Deschenes et al.
RE34,857 E 2/1995 Kunreuther
D362,606 S 9/1995 Deschenes et al.
5,447,263 A 9/1995 Tropper et al.
D364,337 S 11/1995 Deschenes et al.
D365,003 S 12/1995 Davignon et al.
D366,608 S 1/1996 Deschenes et al.
5,495,974 A 3/1996 Deschenes et al.
5,518,162 A 5/1996 Deschenes et al.
5,579,976 A * 12/1996 Kunreuther ............. B65C 7/005 227/71
5,622,257 A 4/1997 Deschenes et al.
5,671,507 A 9/1997 Deschenes et al.
5,678,747 A 10/1997 Kunreuther et al.
5,715,984 A 2/1998 Deschenes
5,738,265 A 4/1998 Hirai et al.
5,810,238 A 9/1998 Kunreuther
5,813,589 A 9/1998 Kim
5,826,775 A 10/1998 Mooney et al.
D402,540 S 12/1998 Stridh
5,915,614 A * 6/1999 Davignon ............... B65C 7/005 227/71
5,938,024 A 8/1999 Deschenes et al.
5,954,242 A 9/1999 Deschenes et al.
D415,953 S 11/1999 Huang
5,975,398 A 11/1999 Evans
6,055,716 A 5/2000 Ayres et al.
6,126,056 A 10/2000 Ueno et al.
D434,630 S 12/2000 Oliver et al.
6,211,243 B1 4/2001 Johnson
6,267,285 B1 7/2001 Raymond et al.
6,267,286 B1 7/2001 Deschenes et al.
6,353,981 B1 3/2002 Smith
6,418,597 B1 7/2002 Deschenes et al.
6,427,895 B1 8/2002 Deschenes
6,638,297 B1 10/2003 Huitema
6,685,077 B1 2/2004 Davignon et al.
D522,330 S 6/2006 Arnold et al.
D528,402 S 9/2006 Ruan
D549,554 S 8/2007 Heppner
D590,685 S 4/2009 Sterling
D596,007 S 7/2009 Price et al.
8,316,529 B2 11/2012 Davis et al.
8,381,958 B2 2/2013 Lussier et al.
D696,576 S 12/2013 Ng
9,271,726 B2 3/2016 Euteneuer
D767,372 S 9/2016 Itou et al.
D780,311 S 2/2017 Cheney et al.
D808,253 S 1/2018 Daniels
D895,113 S 9/2020 Blair et al.
D914,491 S 3/2021 Daniels
D957,636 S 7/2022 Blair et al.
D969,589 S 11/2022 Buczynski
D972,393 S 12/2022 Karlsson
D976,676 S 1/2023 Schmidt
2003/0187465 A1* 10/2003 Bailly .................. A61B 17/068 606/143
2005/0125958 A1 6/2005 Deschenes et al.
2010/0230462 A1 9/2010 Lussier et al.
2013/0167356 A1 7/2013 Hagie et al.
2015/0211565 A1 7/2015 Benedetti
2016/0135808 A1 5/2016 Anderson
2017/0305316 A1 10/2017 Lafferty et al.
2017/0349117 A1 12/2017 Mingerink et al.
2018/0236915 A1 8/2018 Agonia et al.
2020/0197005 A1 6/2020 Daniel
2021/0386422 A1 12/2021 Maclure et al.
2022/0242287 A1 8/2022 Cuerda et al.
2023/0054506 A1 2/2023 Lee et al.
2023/0085801 A1 3/2023 Tollimagi

FOREIGN PATENT DOCUMENTS

CN 301364410 10/2010
CN 301719092 11/2011
CN 203158329 8/2013
CN 306626754 6/2021
CN 306837364 9/2021
CN 306890218 10/2021
CN 307286421 4/2022
DE 3625481 2/1988
EM 008548911-0004 5/2021
GB 1474242 5/1977
GB 4006092 2/2008
GB 6014567 6/2017
GB 6214058 7/2022
JP 2-45340 2/1990
JP 06171632 6/1994
JP D1380076 1/2010
JP 2012-519783 8/2012
JP 50-41643 10/2012

(56) References Cited

FOREIGN PATENT DOCUMENTS

| | | |
|---|---|---|
| JP | D1455928 | 10/2012 |
| KR | 301062203 | 6/2020 |
| WO | 98/21990 | 5/1998 |

OTHER PUBLICATIONS

SeeRaphee, 304 Stainless Steel U Bolt Set Marine Boat Deck Hardware M8x100, Date first available May 23, 2018, [online] retrieved Dec. 28, 2020, available from internet, https://www.amazon.com/Stainless-Steel-Marine-Hardware-M8x100/dp/B07D7TYRGX/ref+sr_1_20_sspa?dchild=1&keywords=u+shaped+fasteners&qid (Year: 2018).

Unistrut, Genuine Unistrut Brand P1047-EG 5 Hole"U" Shaped Connector Bracket, Date first available Feb. 7, 2014, [online] retrieved Dec. 28, 2020, available from internet, https://www.amazon.com/Genuine-Unistrut-P1047-EG-Connector-Bracket/dp/B00IASG7BA/ref=sr_1_45?dchild=1&keywords=u+shaped+fasteners& (Year: 2014).

Prime-Line Store, MP7018 Wire Shelf Loop Clip, Date first available Nov. 9, 2017, [online] retrieved Dec. 28, 2020, available from internet, https://www.amazon.com/Prime-Line-MP7018-Wire-Shelf-Piece/dp/B07793L26V/ref=sr_1_175?dchild=1&keywords=u+shaped+fasteners&qid=1609280165&sr=8-175 (Year 2017).

Bulk Hardware, BH03720 Galvanised Netting Staple, Date first available: Jan. 20, 2017, [online] retrieved Apr. 9, 2021, available from https://www.amazon.com/Bulk-hardware-BH03720-Galvanized-Netting/dp/B01BHQKPKA/ref=sr_1_45?dchild=1&keywords=u+shaped+fasteners&qid=1617974810&sr=8-45 (Year: 2017).

Harris Hardware, TP1756 2 Ear Wall Bracket, Date first available Oct. 18, 2019, [online] retrieved Apr. 9, 2021, available from https://www.amazon.com/Harris-Hardware-TP1756-Bracket-Chrome/dp/B07MFW7ZZZ/ref=pd_sbs_9?pd_rd_w=DKGPr&pf_rd_p=2419a049-62bf-452e-b0d0-ca5b7e35a7b4&pf_rd_r=3ESC62KWG8PNKFVPNMRD& (Year: 2019).

International Search Report and Written Opinion dated Aug. 3, 2020 issued in corresponding IA No. PCT/US2020/027185 filed Apr. 8, 2020.

International Preliminary Report on Patentability dated Sep. 28, 2021 issued in corresponding IA No. PCT/US2020/027185 filed Apr. 8, 2020.

* cited by examiner

APPARATUS AND METHODS FOR FASTENING AN ELEMENT TO A SUPPORT STRUCTURE

The present application is a 371 of International Application No. PCT/US2020/027185, which was published in English on Oct. 15, 2020, and claims the benefit of U.S. Provisional Patent Application Nos. 62/833,434 filed Apr. 12, 2019 and 62/939,859 filed Nov. 25, 2019, all of which are incorporated herein by reference in their entireties.

FIELD OF THE INVENTION

The present disclosure relates generally to apparatus and methods for fastening an element to a support structure and, more particularly, to apparatus comprising a hollow needle and an ejector pin and methods of ejecting a fastener from a hollow needle with an ejector pin to fasten an element to a support structure.

BACKGROUND

It is known to secure a button to fabric with a pair of hollow needles and a corresponding pair of ejector pins. Typically, the hollow needles are inserted through a pair of holes in a button. A user then inserts the needles into the fabric at a preselected location. The pair of ejector pins then force each end of a fastener through a corresponding hollow needle to fasten the button to the fabric. However, conventional apparatus may provide undesired resistance to ejection of the fastener through the hollow needle. Furthermore, conventional apparatus may not adequately sandwich the button between the apparatus and the fabric.

SUMMARY

The following presents a simplified summary of the disclosure to provide a basic understanding of some embodiments described in the detailed description.

In accordance with some embodiments, an apparatus can comprise a first hollow needle comprising a first open end tapering in an outer direction to a tip, a second open end opposite the first open end, and a slot extending along an axis of first hollow needle at least partially between the first open end and the second open end. The apparatus can further comprise a first ejector pin aligned with the axis of the first hollow needle. The first ejector pin can comprise an outer peripheral surface, a first end portion comprising a first portion of the outer peripheral surface, and a central portion comprising a second portion of the outer peripheral surface. The first portion of the outer peripheral surface can comprise a stepped recess from the second portion of the outer peripheral surface.

In accordance with some embodiments, an apparatus can comprise a first hollow needle comprising a first open end tapering in an outer direction to a tip, a second open end opposite the first open end, and a slot extending along an axis of first hollow needle at least partially between first open end and the second open end. The apparatus can comprise a first ejector pin aligned with the axis of the first hollow needle. The apparatus can further comprise a cap comprising a first end portion, a second end portion opposite the first end portion, and an aperture in communication with an interior area of the cap and extending through an outer surface of the second end portion. The first end portion of the cap can be configured for mounting to a nose of the apparatus with a portion of the first hollow needle positioned within the interior area of the cap while the tip of the first hollow needle is recessed from the outer surface of the second end portion, and wherein the aperture is sized for insertion of the tip of the first hollow needle through the aperture when the cap is removed from the nose.

In some embodiments, an apparatus can comprise a nose comprising a first support surface facing an outer direction and a second support surface facing the outer direction and protruding from the first support surface in the outer direction. The first support surface can radially extend from an outer periphery of the second support surface. A first hollow needle can extend through the second support surface. The first hollow needle can comprise a first open end tapering in the outer direction to a tip, a second open end opposite the first open end, and a slot extending along an axis of first hollow needle at least partially between the first open end and the second open end. A second hollow needle can extend through the second support surface. The second hollow needle can comprise a first open end tapering in the outer direction to a tip, a second open end opposite the first open end of the second hollow needle, and a slot extending along an axis of the second hollow needle at least partially between the first open end and the second open end of the second hollow needle.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
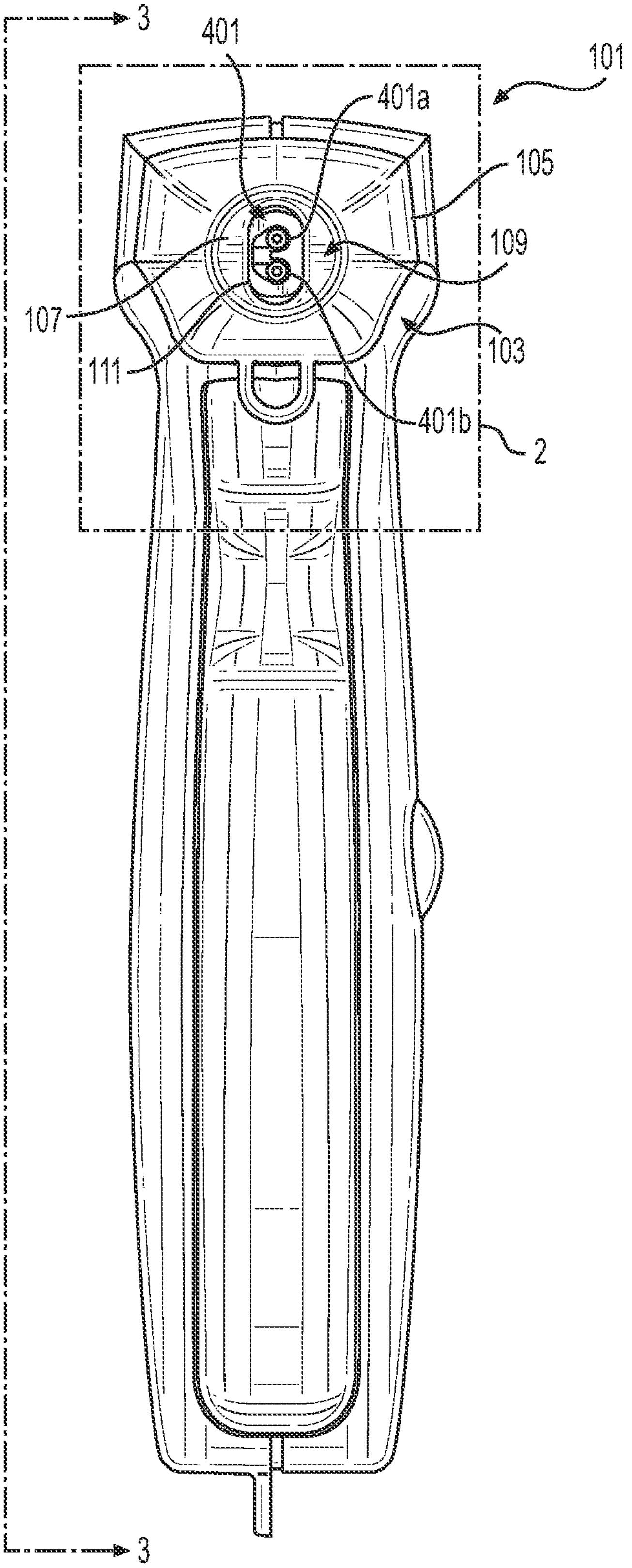
FIG. 1 illustrates a front view of the apparatus for fastening an element to a support structure in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 2:
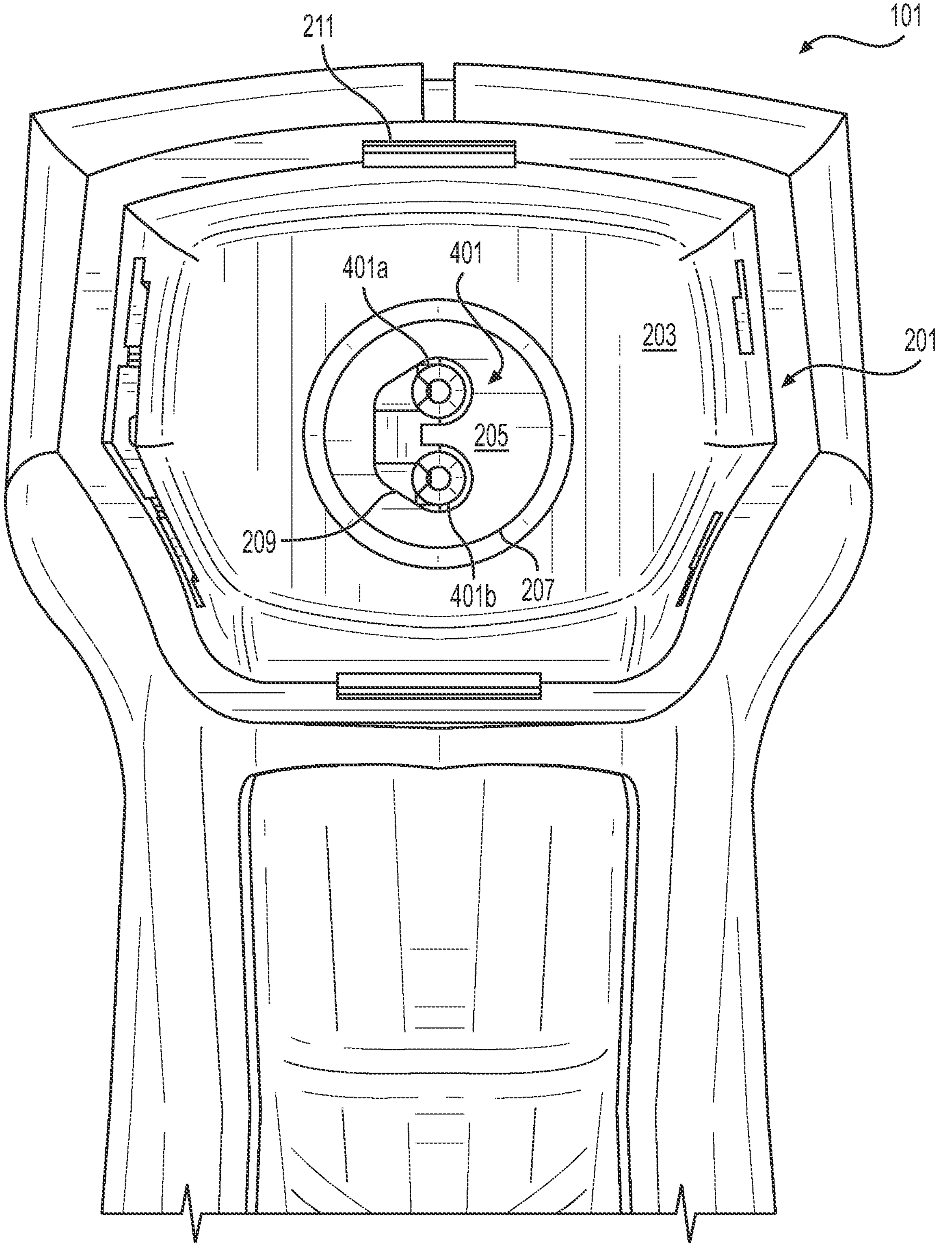
FIG. 2 illustrates an enlarge portion of the apparatus taken at view 2 of FIG. 1 with the cap removed from the nose of the apparatus.

FIG. 1 illustrates a front view of an apparatus 101 with a cap 103 installed over a nose 201 (see FIG. 2) of the apparatus 101. FIG. 2 illustrates an enlarged view of the nose 201. In some optional embodiments, the nose 201 can comprise a first support surface 203 facing an outer direction 603 (e.g., the outer direction 603 illustrated and discussed with respect to FIG. 6 below). In some optional embodiments, the nose 201 can comprise a second support surface 205 facing the outer direction 603. In some embodiments, as illustrated the first support surface 203 and the second support surface 205 can be substantially flat surfaces although one or both of the first support surface 203 or the second support surface 205 may be curved in some embodiments. Furthermore, as shown, the first support surface 203 can extend along a first plane and the second support surface 205 can extend along a second plane that may be parallel to the first plane although the planes may be positioned at an angle in further embodiments.

Figure 4:
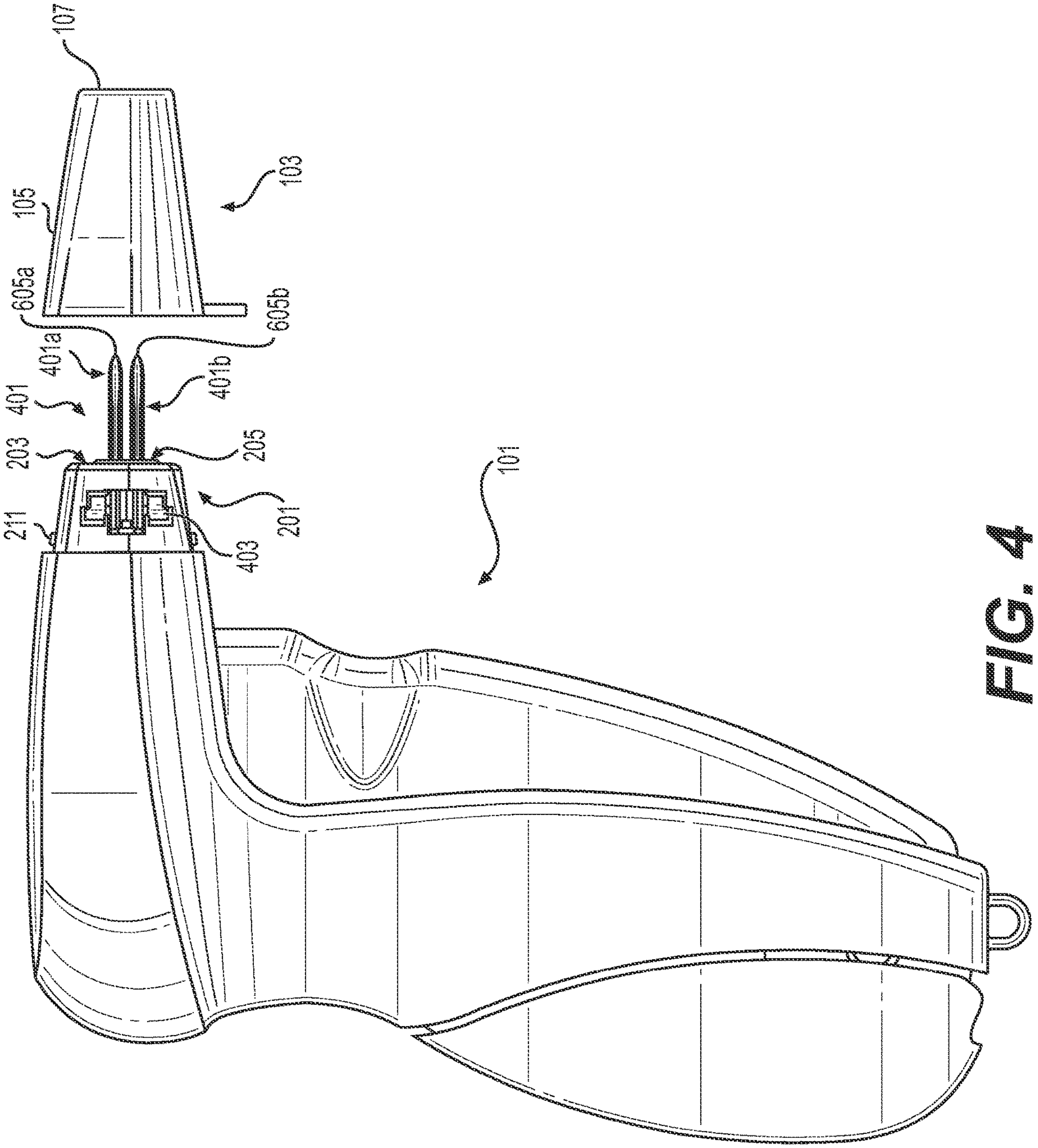
FIG. 4 illustrates the right side view of FIG. 3 but with the cap removed from the nose of the apparatus.
Figure 5:
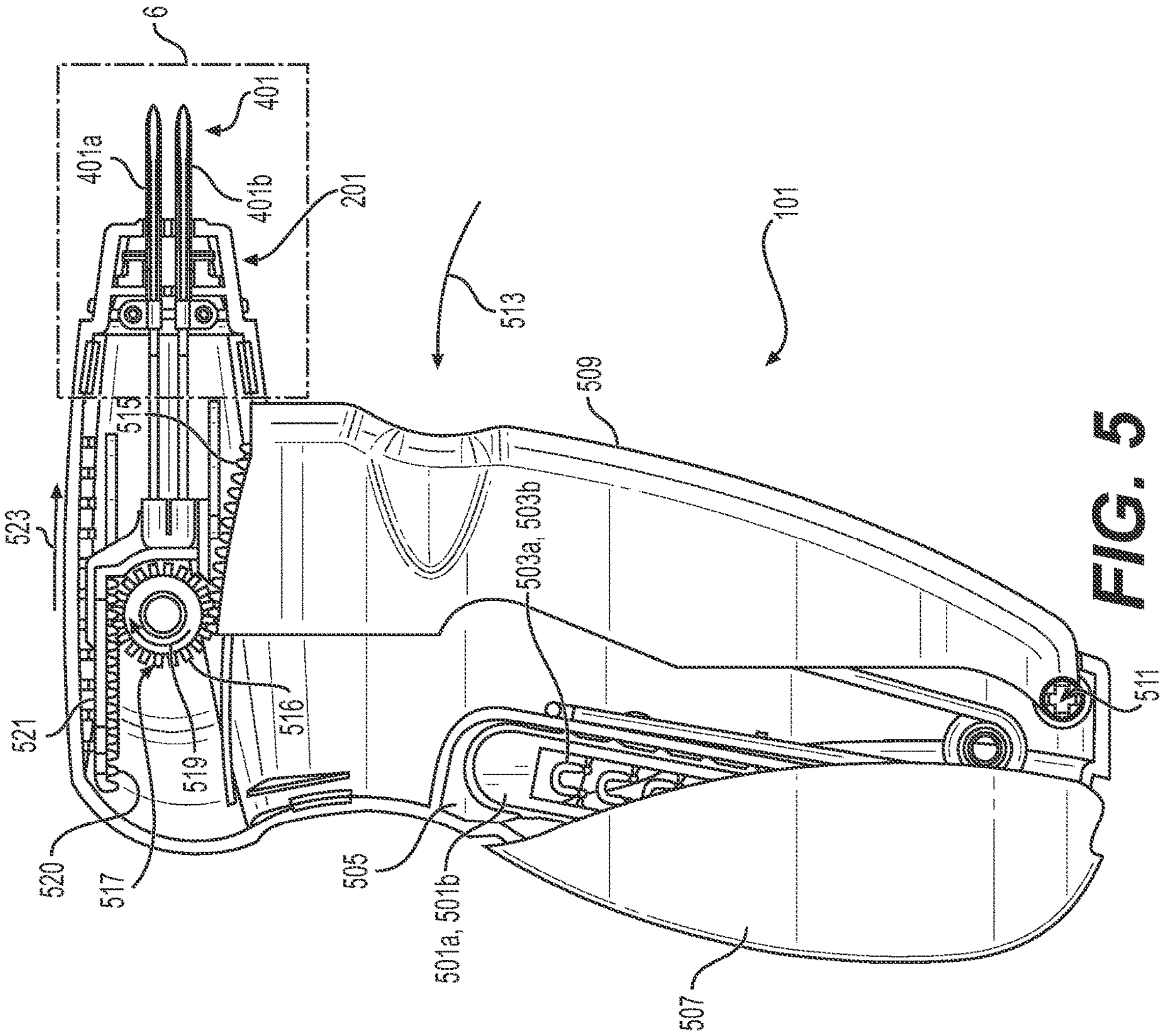
FIG. 5 illustrates the right side view of FIG. 3 but with the cap and a right-side housing panel removed from the apparatus.
Figure 6:
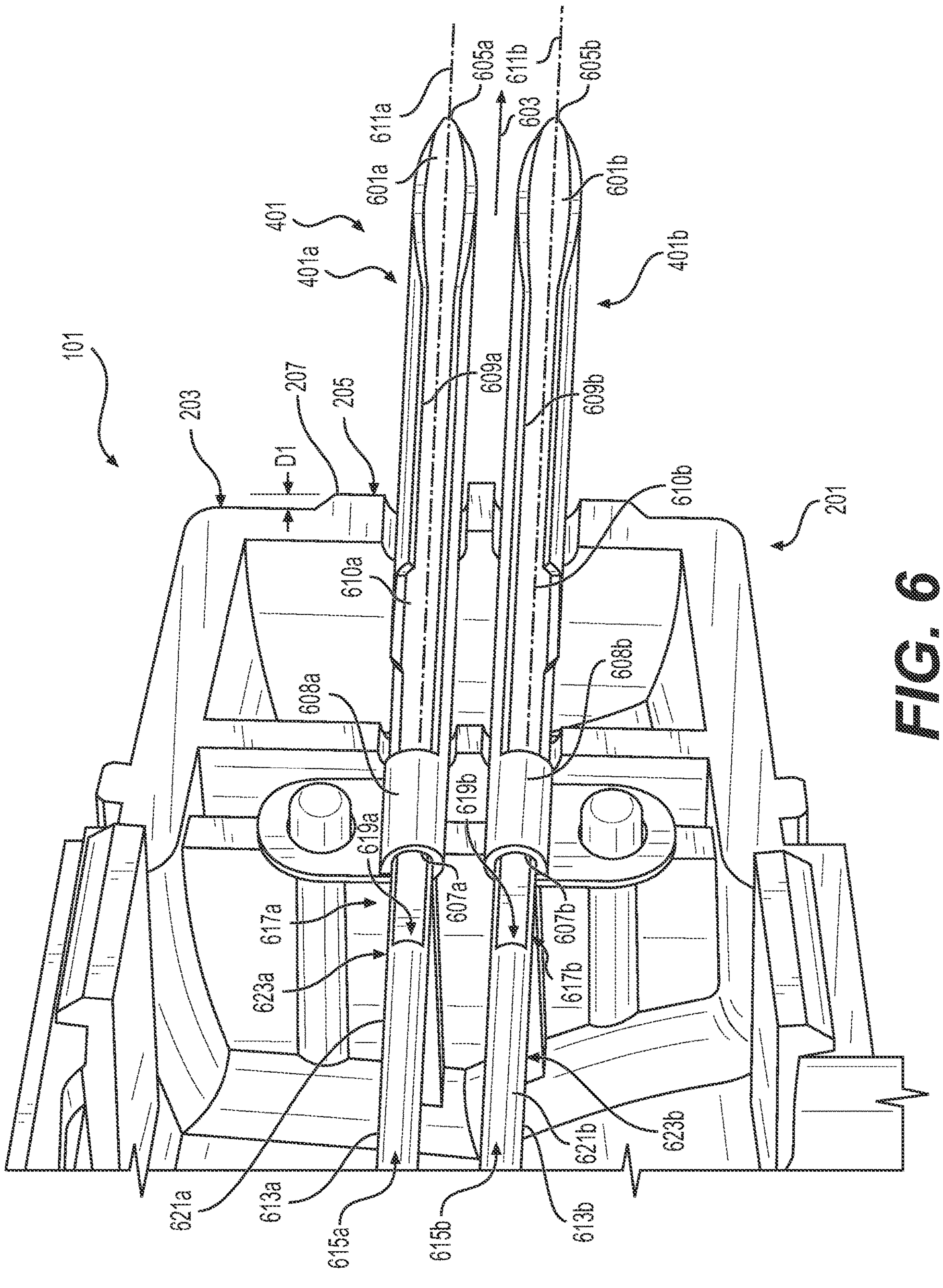
FIG. 6 illustrates an enlarge perspective view of portions of the apparatus taken at view 6 of FIG. 5.
Figure 12:
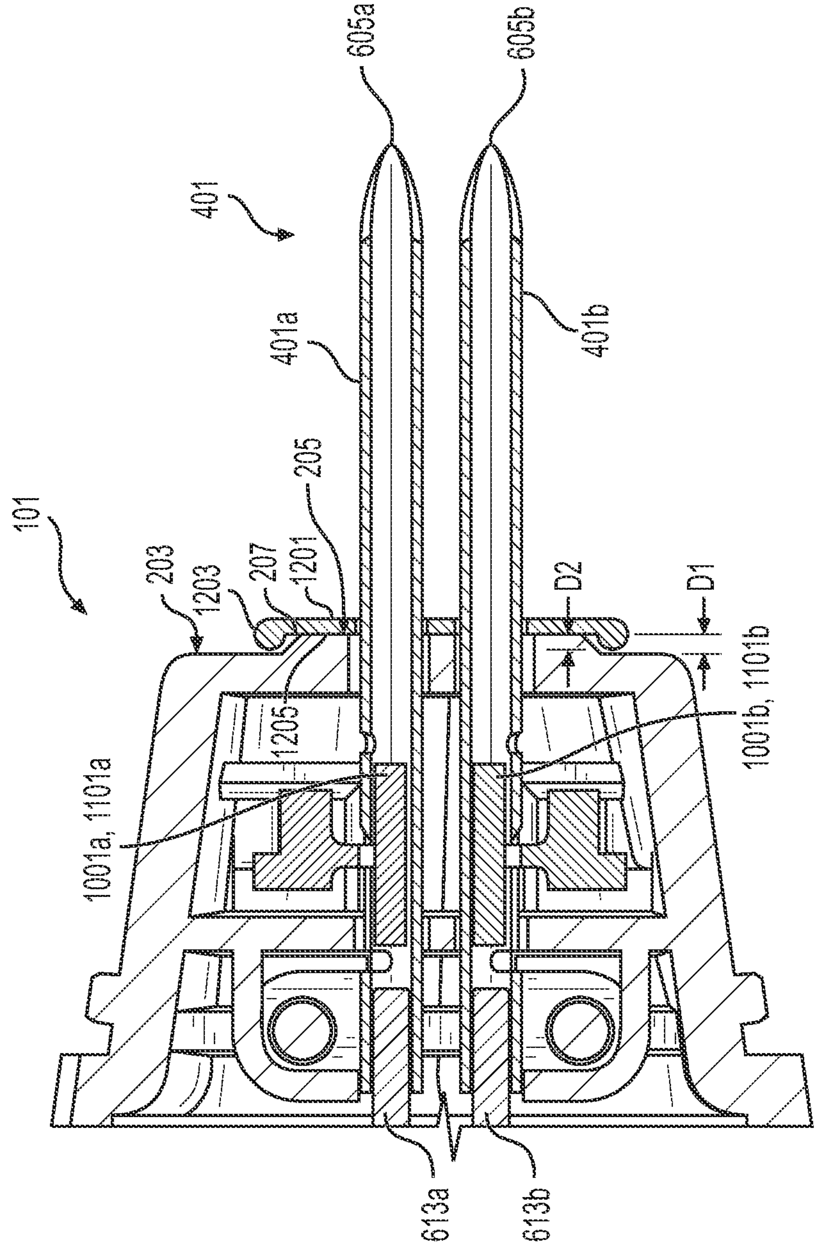
FIG. 12 is a schematic cross-sectional view of portions of the apparatus and one of the fasteners illustrated in FIGS. 10-11 with the hollow needles being inserted into corresponding holes of a button.

As shown in FIG. 6, the second support surface 205 can protrude from the first support surface 203 by a distance "D1" in the outer direction 603. In some embodiments, as shown in FIG. 12, the distance "D1" that the second support surface 205 protrudes from the first support surface 203 can be greater than or equal to a recess distance "D2" of a button 1201 below an outer rim 1203 of the button 1201. In some embodiments, the distance "D1" can be from about 1 millimeter (mm) to about 5 mm, such as from about 1 mm to about 3 mm although other distances may be provided in further embodiments. As shown in FIGS. 4-6, the first support surface 203 can radially extend from an outer periphery 207 of the second support surface 205. In still further embodiments, as shown in FIG. 2, the first support surface 203 can entirely circumscribe the outer periphery 207 of the second support surface 205 wherein the first support surface 203 surrounds the entire outer periphery 207 of the second support surface 205. Although not shown, the first support surface 203 may only partially circumscribe the outer periphery 207 of the second support surface 205 in further embodiments. As shown in FIG. 2, the outer periphery 207 can be circular although other shapes may be provided in further embodiments. In some embodiments, as shown in FIG. 12, the shape of the outer periphery 207 of the second support surface 205 may be designed permit the second support surface 205 to nest and snugly fit within a circular recess 1205 of the button 1201.

The apparatus 101 can comprise a single hollow needle although the apparatus 101 can comprise two or more hollow needles in further embodiments. For example, as shown in FIGS. 1, 2, 4-6, 10-14 and 17, the apparatus 101 can comprise a plurality of hollow needles 401 comprising a first hollow needle 401*a* and a second hollow needle 401*b*. As shown in FIG. 2, the first hollow needle 401*a* and the second hollow needle 401*b* can each extend through an opening 209 in the second support surface 205. As shown, in some embodiments, the opening 209 can comprise a C-shaped opening to allow passage of a filament of a fastener as discussed more fully below. Other shaped openings 209 may be provided that can depend on the number of hollow needles and/or the type of fastener.

Figure 3:
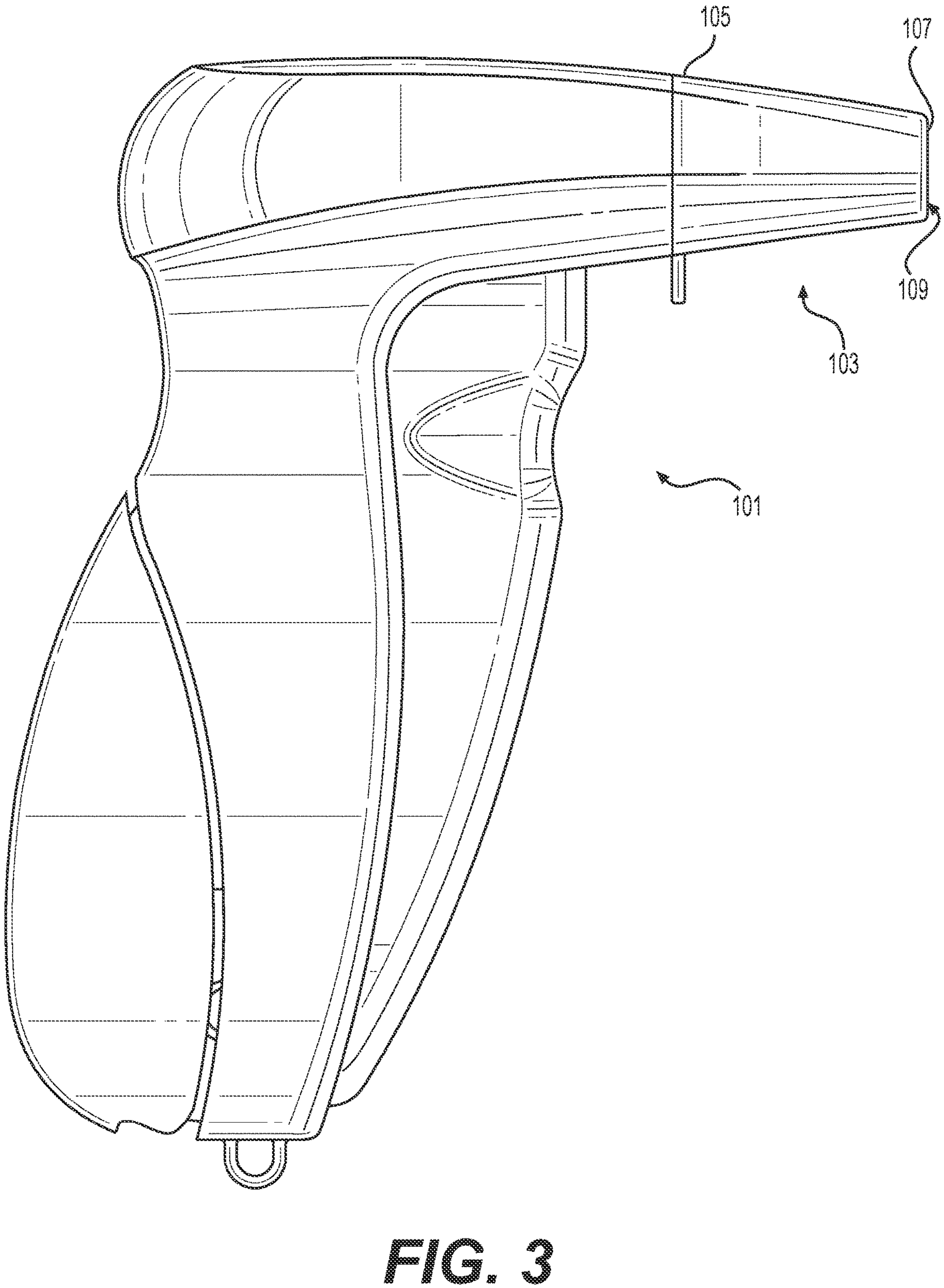
FIG. 3 illustrates a right side view of the apparatus taken at view 3-3 of FIG. 1.
Figure 13:
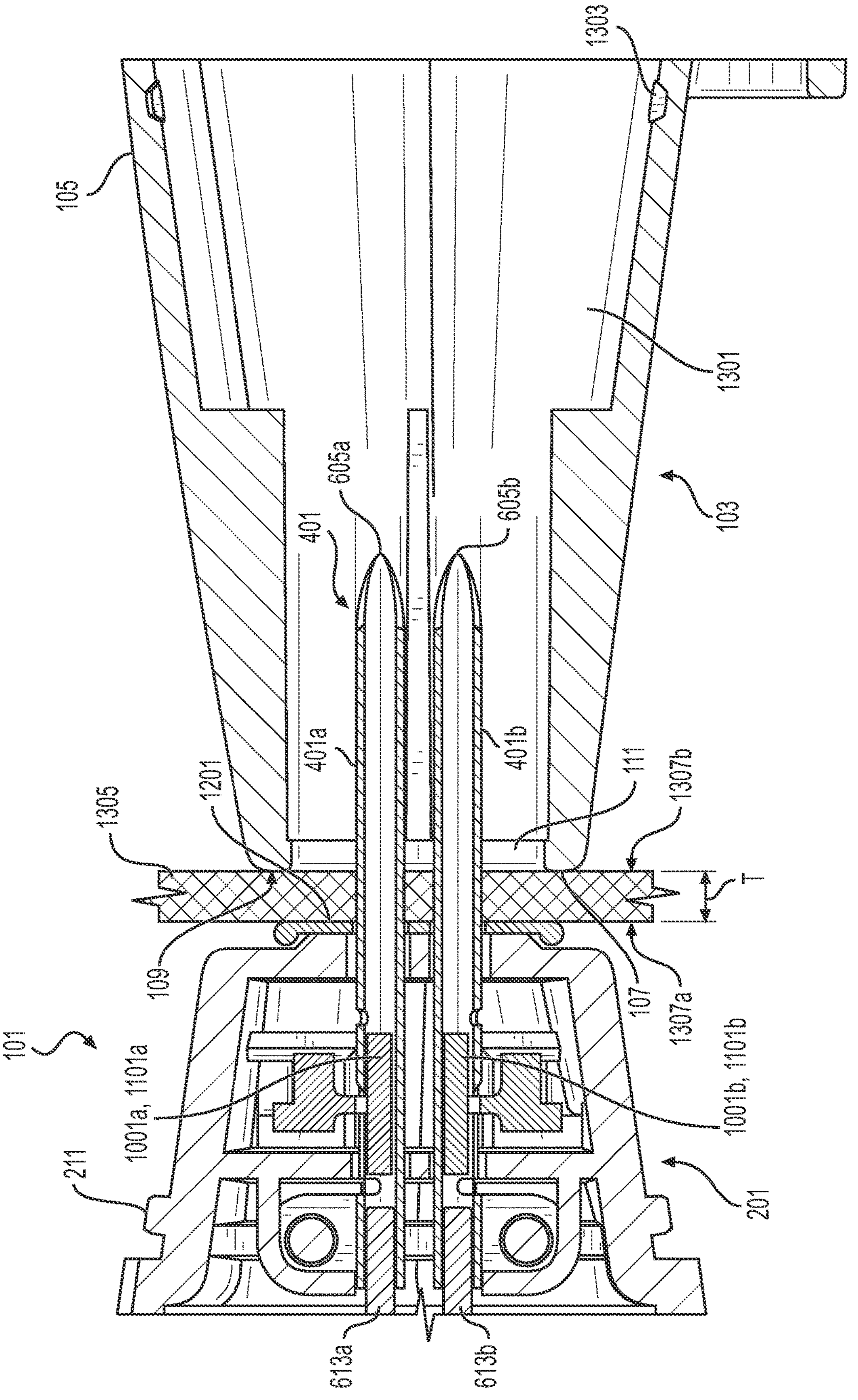
FIG. 13 illustrates the schematic view of FIG. 12 with the hollow needles piercing fabric with the cap of the apparatus pressing the button and a fabric between the nose and the cap.

As shown in FIGS. 1, 3 and 4, the apparatus 101 can comprise a cap 103 that can comprise a first end portion 105, a second end portion 107 opposite the first end portion 105. The first end portion 105 is configured for mounting to the nose 201. For instance, as shown in FIG. 13, the cap 103 can define an interior area 1301 and the first end portion 105 can comprise cavities 1303 designed to snappingly receive protrusions 211 (see FIG. 2) from the nose 201. Thus, as shown in FIGS. 1 and 3, the nose 201 can be inserted into the interior area 1301 of the first end portion 105 of the cap 103 such that the protrusions 211 are snappingly received in the cavities 1303 to removably mount the cap 103 to the nose 201 of the apparatus 101. As can be appreciated (e.g., from FIGS. 1 and 3-4), once mounted, a portion of the first hollow needle 401*a* and a portion of the second hollow needle 401*b* are each positioned within the interior area 1301 of the cap 103. As can further be appreciated (e.g., from FIGS. 1 and 3-4), a tip 605*a* (see FIG. 4) of the first hollow needle 401*a* and a tip 605*b* (see FIG. 4) of the second hollow needle 401*b* can be recessed from an outer surface 109 of the second end portion 107. Consequently, the portions of the hollow needles extending from the second support surface 205 of the nose 201 can be protected by the cap 103 when the cap 103 is mounted to the nose 201 of the apparatus 101.

In some embodiments, the cap 103 can comprise an optional aperture 111 (e.g., see FIGS. 1 and 13) in communication with the interior area 1301 of the cap 103 and extending through the outer surface 109 of the second end portion 107. The aperture 111 can be sized for insertion of the tip 605*a* of the first hollow needle 401*a* and the tip 605*b* of the second hollow needle 401*b* through the aperture 111 when the cap 103 is removed from the nose 201. The aperture 111 can comprise a wide range of shapes and sizes depending on the number and arrangement of hollow needles. For instance, as shown in FIG. 1, the aperture can comprise an oblong aperture sized to simultaneously receive both the tip 605*a* of the first hollow needle 401*a* and the tip 605*b* of the second hollow needle 401*b*. A single oblong aperture may facilitate simultaneous insertion of the tips 605*a*, 605*b* and facilitate fastening of an element to a support structure without interference with the cap 103.

Referring to FIG. 6, the first hollow needle 401*a* can comprise a first open end 601*a* tapering in the outer direction 603 to the tip 605*a*, and a second open end 607*a* opposite the first open end 601*a*. In some embodiments, the second open end 607*a* comprises a sleeve 608*a* of the first hollow needle 401*a* and a slot 609*a* extending along an axis 611*a* of the first hollow needle 401*a* at least partially between the first open end 601*a* and the second open end 607*a*. For example, the slot 609*a* can extend along the axis 611*a* of the first hollow needle 401*a* from a lateral reception area 610*a* of the slot 609*a* to the first open end 601*a* of the first hollow needle 401*a*.

The second hollow needle 401*b*, if provided, can comprise a mirror image of the first hollow needle 401*a*. For example, the second hollow needle 401*b* can comprise a first open end 601*b* tapering in the outer direction 603 to the tip 605*b*, and a second open end 607*b* opposite the first open end 601*b*. In some embodiments, the second open end 607*b* comprises a sleeve 608*b* of the second hollow needle 401*b* and a slot 609*b* extending along an axis 611*b* the second hollow needle 401*b* at least partially between the first open end 601*b* and the second open end 607*b*. For example, the slot 609*b* can extend along the axis 611*b* of the second hollow needle 401*b* from a lateral reception area 610*b* of the slot 609*b* to the first open end 601*b* of the second hollow needle 401*b*.

Figure 8:
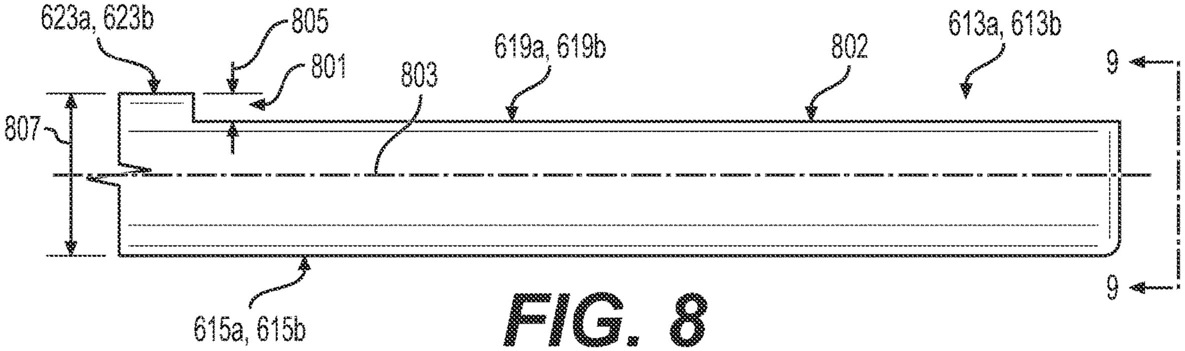
FIG. 8 illustrates a side view of the outer ends of the ejector pins taken at view 8-8 of FIG. 7.
Figure 9:
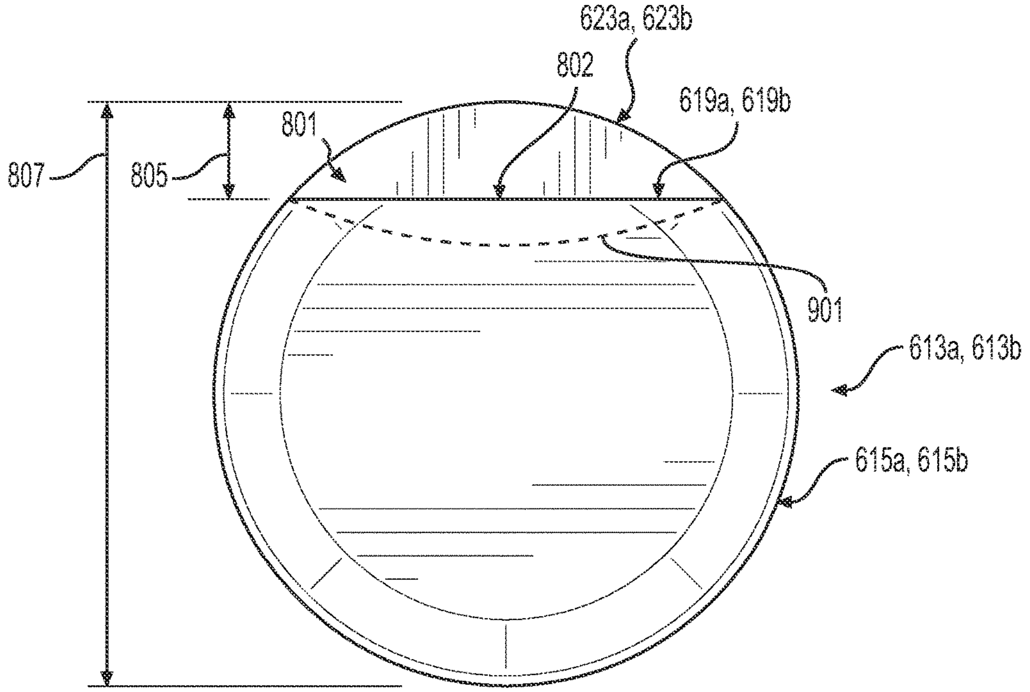
FIG. 9 illustrates an end view of the outer ends of the ejector pins taken at view 9-9 of FIG. 8.

A first ejector pin 613*a* can be aligned with the axis 611*a* of the first hollow needle 401*a*. The first ejector pin 613*a* can comprise an outer peripheral surface 615*a*. A first end portion 617*a* of the first ejector pin 613*a* can comprise a first portion 619*a* of the outer peripheral surface 615*a*. A central portion 621*a* of the first ejector pin 613*a* can comprise a second portion 623*a* of the outer peripheral surface 615*a*. As shown in FIGS. 8-9, the first portion 619*a* of the outer peripheral surface 615*a* of the first ejector pin 613*a* can comprise a stepped recess 801 from the second portion 623*a* of the outer peripheral surface 615*a* of the first ejector pin 613*a*.

A second ejector pin 613*b* can be aligned with the axis 611*b* of the second hollow needle 401*b*. The second ejector pin 613*b* can comprise an outer peripheral surface 615*b*. A first end portion 617*b* of the second ejector pin 613*b* can comprise a first portion 619*b* of the outer peripheral surface 615*b*. A central portion 621*b* of the second ejector pin 613*b* can comprise a second portion 623*b* of the outer peripheral surface 615*b*. As shown in FIGS. 8-9, the first portion 619*b* of the outer peripheral surface 615*b* of the second ejector pin 613*b* can comprise a stepped recess 801 from the second portion 623*b* of the outer peripheral surface 615*b* of the second ejector pin 613*b*.

With reference to FIG. 8, each ejector pin 613*a*, 613*b* can extend along a linear axis 803. The stepped recess 801 can include a depth 805 measured in a direction perpendicular to the linear axis 803 and the second portion 623*a*, 623*b* can include a height 807 also measured in the direction perpendicular to the linear axis 803. As shown, the height 807 can comprise a diameter of the second portion 623*a*, 623*b* when the second portion 623*a*, 623*b* comprises a circular cylindrical portion. However, the second portion may comprise a quadrilateral or other configuration where the height is a dimension of the configuration. In some embodiments, the depth 805 can be from about 5% to about 50% of the height 807, from about 10% to about 40% of the height 807, from about 10% to about 30% of the height 807 although other ranges can be provided in further embodiments. In some embodiments, the depth 805 can be from about 10 microns to about 400 microns, from about 50 microns to about 300 microns, about 100 microns to about 300 microns, about 200 microns to about 300 microns or other depths.

Figure 7:
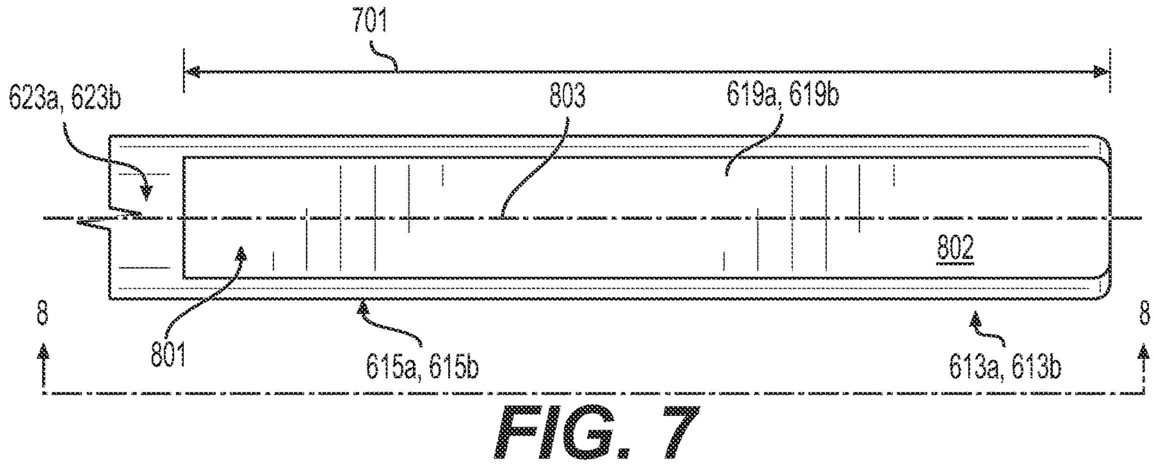
FIG. 7 illustrates a top view of outer ends of the ejector pins of FIG. 6.

With reference to FIG. 7, the stepped recess 801 can include a length 701 measured in the direction of the linear axis 803. The length 701 can be about 2 millimeters (mm) to about 12 mm, from about 5 mm to about 10 mm, from about 6 mm to about 9 mm although other lengths may be provided in further embodiments.

In some embodiments, the stepped recess 801 of the first ejector pin 613*a* and the second ejector pin 613*b* can comprise a flat surface 802 extending in the outer direction 603 of the respective axis 611*a* of the first hollow needle 401*a* and the axis 611*b* of the second hollow needle 401*b*. In alternative embodiments, as indicated by the dashed curved line in FIG. 9, the stepped recess 801 of the second ejector pin 613*b* comprises a concave surface 901 extending in the outer direction 603 of the respective axis 611*a* of the first hollow needle 401*a* and the axis 611*b* of the second hollow needle 401*b*. For instance, as shown in dashed lines in FIG. 9, the cross-section of the concave surface 901 can include a cross-sectional concave profile along a plane perpendicular to the outer direction 603 and along the outer direction 603.

Methods of fastening an element to a support structure with the apparatus 101 will now be described. As shown in FIGS. 12-14 and 17-19, the element can comprise the illustrated button 1201 although other elements may be provided in further embodiments. For example, in further embodiments, the element may comprise a price tag, a radio frequency identification device (RFID device), a decoration, additional fabric, or other element. As shown in FIGS. 13-14 and 17-19, the support structure 1305 may comprise a fabric although cardboard, wood, plastic or other material capable of being penetrated by one or more hollow needles may be provided in further embodiments. Further, at least one additional element and/or support structure may be provided in other embodiments.

The filament can comprise a first end and a second end opposite the first end. The first end can be provided with a first anchor and the second end can be provided with a second anchor. In some embodiments, both the first and second anchor may be designed to pass through the support structure 1305 with a corresponding first and second hollow needle to fasten the element to the support structure. For example, as discussed throughout the application, the first anchor and the second anchor may be passed through the support structure 1305 with the corresponding first and second hollow needle to fasten a button to the support structure 1305.

In some embodiments, although not shown, only a single anchor is designed to be passed through the support structure with a single hollow needle to fasten the element to the support structure. For example, in some embodiments, the first anchor may be passed through the support structure with a single hollow needle to fasten the first end of the filament to the support structure while the second anchor may fasten the element to the second end of the filament without passing through the support structure. In such embodiments, the filament may be threaded through the support structure while the first end of the filament can be prevented from passing through the support structure by the first anchor and the second end of the filament can be prevented from passing through the support structure by the second anchor and/or the element. In some embodiments, the second anchor may facilitate attachment of the element to the filament wherein the second anchor and element may be separate from one another. In some embodiments, the second anchor may comprise the element wherein the element also functions as the second anchor and is integral with the second end of the filament.

Figure 10:
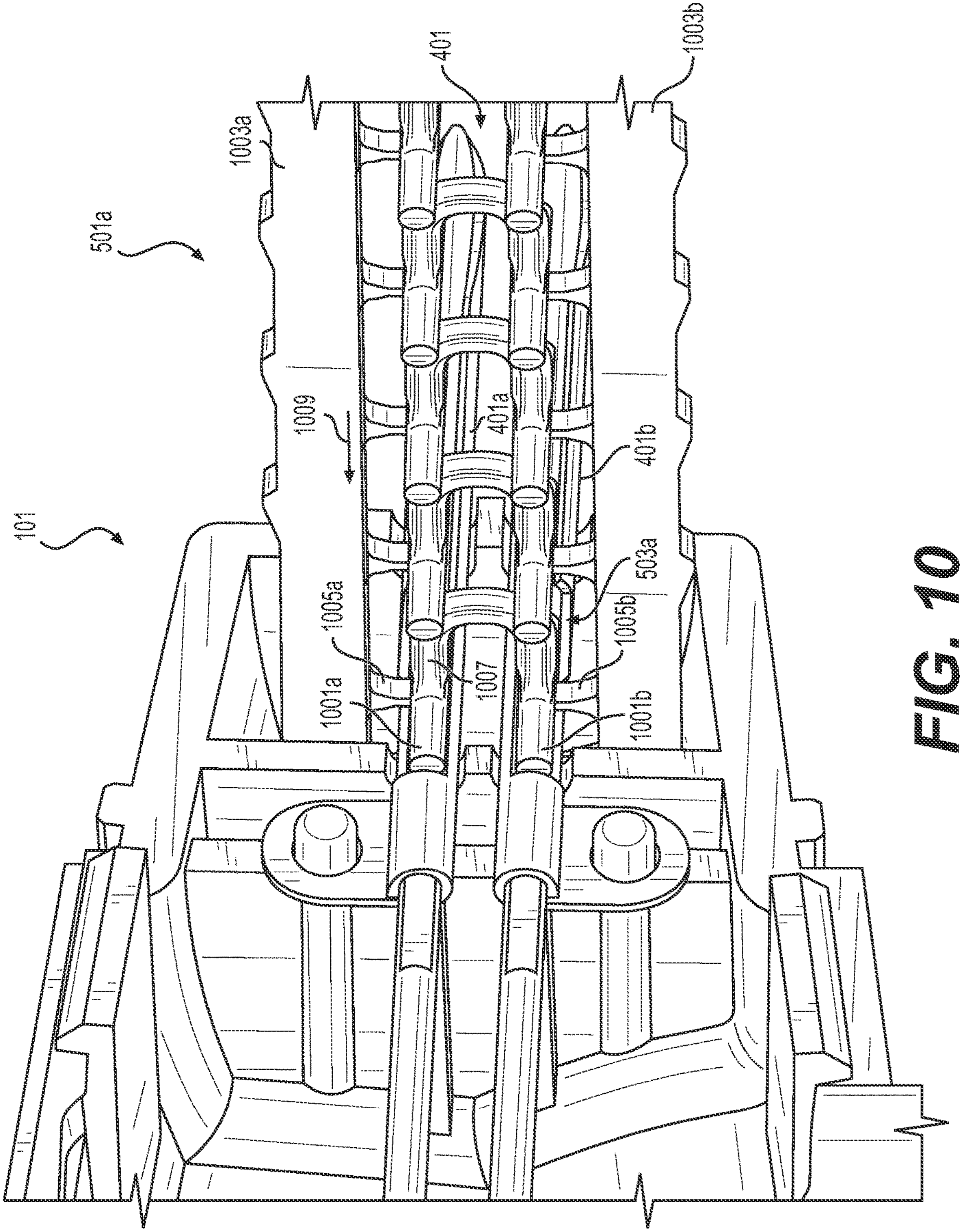
FIG. 10 illustrates the enlarged perspective view of the portions of the apparatus illustrated in FIG. 6 with each anchor of a fastener of a first embodiment of a clip seated against a corresponding inner surface of a hollow needle.
Figure 11:
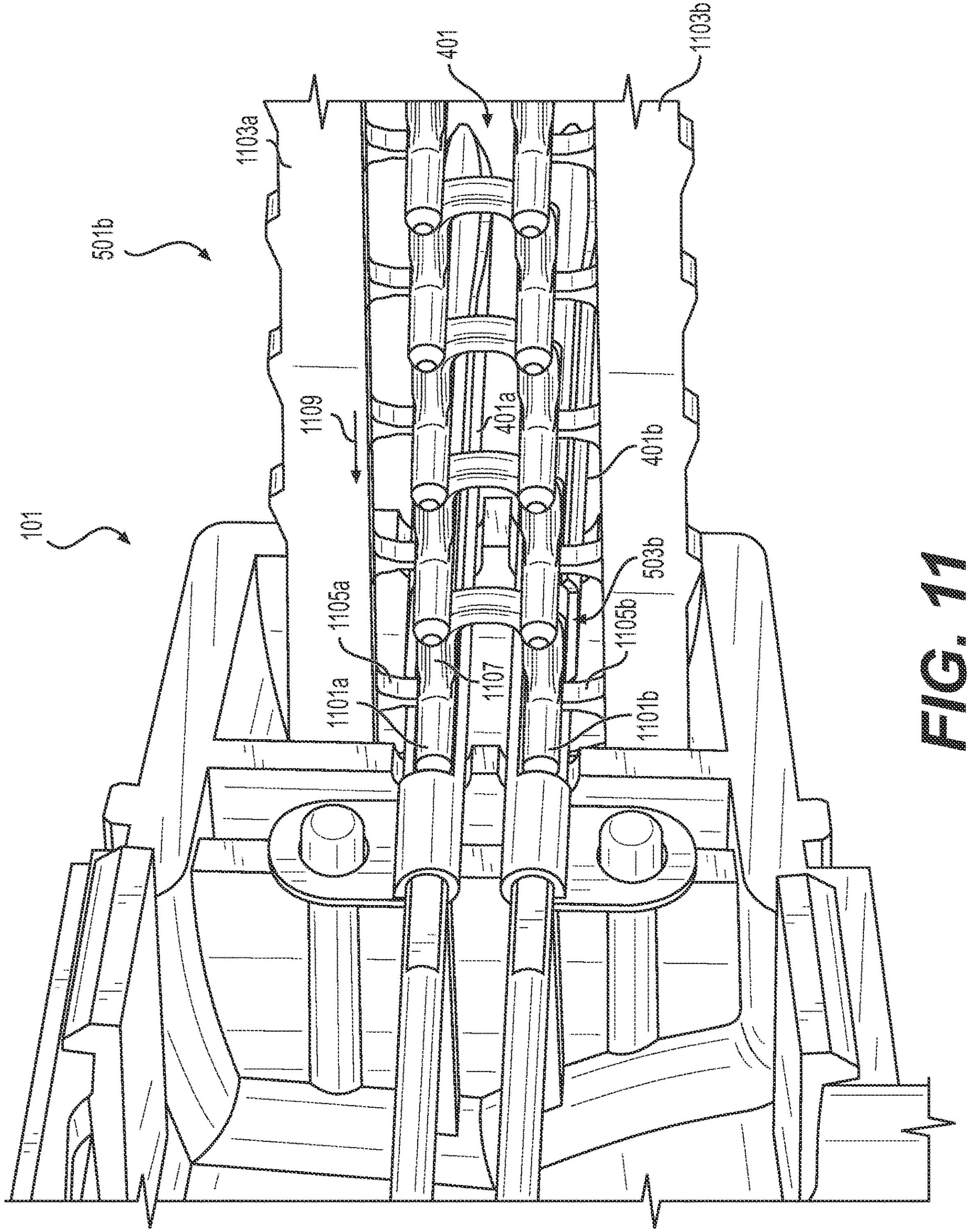
FIG. 11 illustrates the enlarged perspective view of the portions of the apparatus illustrated in FIG. 6 with each anchor of another fastener of a second embodiment of a clip seated against a corresponding inner surface of a hollow needle.

As shown in FIG. 4, in one embodiment, the method can include removing the cap 103 from the nose 201 to expose the hollow needles 401 and the lateral reception area 403 sized to laterally receive a clip of fasteners. Referring to FIG. 5, one or more clips 501*a*, 501*b* of fasteners 503*a*, 503*b* can be stored within a storage area 505 of the apparatus 101. To access the clips 501*a*, 501*b*, an access door 507 may be pivoted open by a user. The user may then select one of the clips 501*a*, 501*b* for loading into the lateral reception area 403. As shown in FIG. 10, each fastener 503*a* of a first embodiment of the clip 501*a* can include a first anchor 1001*a* attached to a first support rail 1003*a* of the clip 501*a* with a first mounting tab 1005*a* and a second anchor 1001*b* attached to a second support rail 1003*b* of the clip 501*a* with a second mounting tab 1005*b*. Each fastener further includes a filament 1007 including a first end attached to the first anchor 1001*a* and a second end attached to the second anchor 1001*b*. As shown in FIG. 11, each fastener 503*b* of a second embodiment of the clip 501*b* can include a first anchor 1101*a* attached to a first support rail 1103*a* of the clip 501*b* with a first mounting tab 1105*a* and a second anchor 1101*b* attached to a second support rail 1103*b* of the clip 501*b* with a second mounting tab 1105*b*. Each fastener further includes a filament 1107 including a first end attached to the first anchor 1101*a* and a second end attached to the second anchor 1101*b*.

As shown in FIG. 10, the first embodiment of the clip 501*a* may be inserted by a user in the insertion direction 1009 until the first anchor 1001*a* is seated within the lateral reception area 610*a* (see FIG. 6) of the slot 609*a* of the first hollow needle 401*a* and the second anchor 1001*b* is seated within the lateral reception area 610*b* (see FIG. 6) of the slot 609*b* of the second hollow needle 401*b*. As shown in FIG. 11, the second embodiment of the clip 501*b* may be inserted by a user in the insertion direction 1109 until the first anchor 1101*a* is seated within the lateral reception area 610*a* (see FIG. 6) of the slot 609*a* of the first hollow needle 401*a* and the second anchor 1101*b* is seated within the lateral reception area 610*b* (see FIG. 6) of the slot 609*b* of the second hollow needle 401*b*.

If the element to be fastened comprises the button 1201, as shown in FIG. 12, the tip 605*a* of the first hollow needle 401*a* can be inserted through a first hole of the button 1201 and the tip 605*b* of the second hollow needle 401*b* can be inserted through a second hole of the button 1201. In many embodiments (see FIG. 12), the first hollow needle 401*a* can be inserted through a first hole of the button 1201 and the second hollow needle 401*b* can be inserted through a second hole of the button 1201 wherein the first and second holes of the button 1201 are larger than the diameter of the first hollow needle 401*a* and the second hollow needle 401*b*. In other embodiments (see FIG. 12-14), the first hollow needle 401*a* can be inserted through a first hole of the button 1201 and the second hollow needle 401*b* can be inserted through a first hole of the button 1201 wherein the first hollow needle 401*a* and the second hollow needle 401*b* snugly fit within the first and second holes of the button 1201.

As shown in FIG. 13, the method can include piercing a first surface 1307*a* of the support structure 1305 with the tip 605*a* of the first hollow needle 401*a* such that the tip 605*a* of the first hollow needle 401*a* passes through a second surface 1307*b* of the support structure 1305 with a portion of the first hollow needle 401*a* extending through a thickness "T" of the support structure 1305. As shown, in some embodiments, the thickness "T" of the support structure 1305 can be greater than the thickness of the button 1201 or other element.

As shown in FIG. 13, the cap 103 can be inverted and the tip 605*a* of the first hollow needle 401*a* and the tip 605*b* of the second hollow needle 401*b* can be inserted through the aperture 111 of the cap 103. The cap 103 can then be pressed towards the nose 201 such that the support structure 1305 (e.g., fabric) and the element (e.g., button 1201) are compressed between the nose 201 and the outer surface 109 of the second end portion 107 of the cap 103 to cause the button 1201 and the fabric to be compacted to help ensure proper deployment of the fastener 503*a*, 503*b* from the apparatus 101. Further, as shown in FIG. 12, the second support surface 205 of the nose can be received within the recess 1205 of the button to help support the button during the fastening process. For example, once the button 1201 is pressed against the second support surface 205, the second support surface 205 is snuggly received within the recess 1205 of the button 1201 to help align and support the button during fastening. The cap 103 therefore provides alternative functionality. For example, the cap 103 can function to protect the needles when the cap is attached to the nose. Furthermore, the cap 103 include an aperture 111 to allow the needles to extend through the aperture while the cap 103 functions to compress the element and support structure together while deploying the fastener 503*a*, 503*b* from the apparatus 101.

Figure 14:
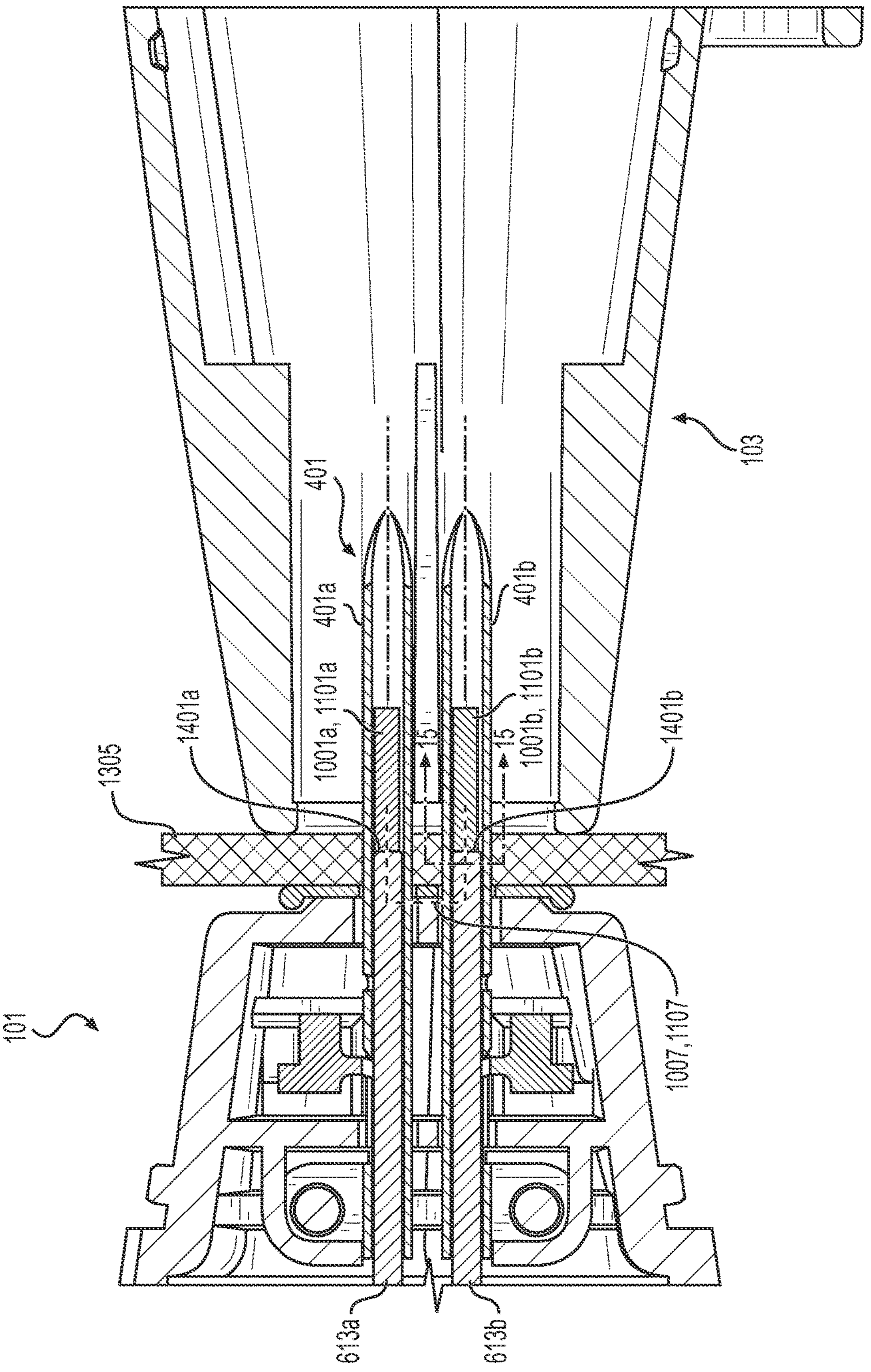
FIG. 14 illustrates the schematic view of FIG. 13 with the ejector pins forcing the anchors of one of the fasteners illustrated in FIGS. 10-11 through the hollow needles while the filament of the fastener is received within the recesses of the ejector pins.

Referring to FIG. 5, to deploy the fastener 503*a*, 503*b*, the lever 509 can be pressed by a user such that the lever 509 pivots in direction 513 about pivot point 511. The teeth 515 of the lever 509 engage the teeth 516 of gear 517 to cause the gear 517 to rotate clockwise as indicated by rotation direction 519. The teeth 516 of the gear 517 engage with teeth 520 of a drive rack 521 to cause the drive rack 521 to translate in direction 523. As shown in FIG. 14, the corresponding outer ends 1401*a*, 1401*b* of the ejector pins 613*a*, 613*b* press against the corresponding anchors such that the first anchor 1001*a*, 1101*a* is inserted into a hollow interior area of the first hollow needle 401*a* and the second anchor 1001*b*, 1101*b* is inserted into a hollow interior area of the second hollow needle 401*b* with the filament extending through the corresponding slot 609*a*, 609*b*. The first anchor 1001*a*, 1101*a* which is attached to a first support rail 1003*a*, 1103*a* of the clip 501*a*, 501*b* with a first mounting tab 1005*a*, 1105*a* and a second anchor 1001*b*, 1101*b* attached to a second support rail 1003*b*, 1103*b* of the clip 501*a*, 501*b* with a second mounting tab 1005*b*, 1105*b* is then separated from first support rail 1003*a*, 1103*a* and second support rail 1003*b*, 1103*b*, respectively, by a cutting edge (e.g., see FIG. 6) of the first hollow needle 401*a* and the cutting edge (e.g., see FIG. 6) of the second hollow needle 401*b*. As shown in FIG. 14, the filament is then pivoted relative to the first anchor 1001*a*, 1101*a* and second anchor 1001*b*, 1101*b* such that the filament is folded over the anchors as indicated by the filament 1007, 1107 schematically shown as a dashed line in FIG. 14.

Figure 15:
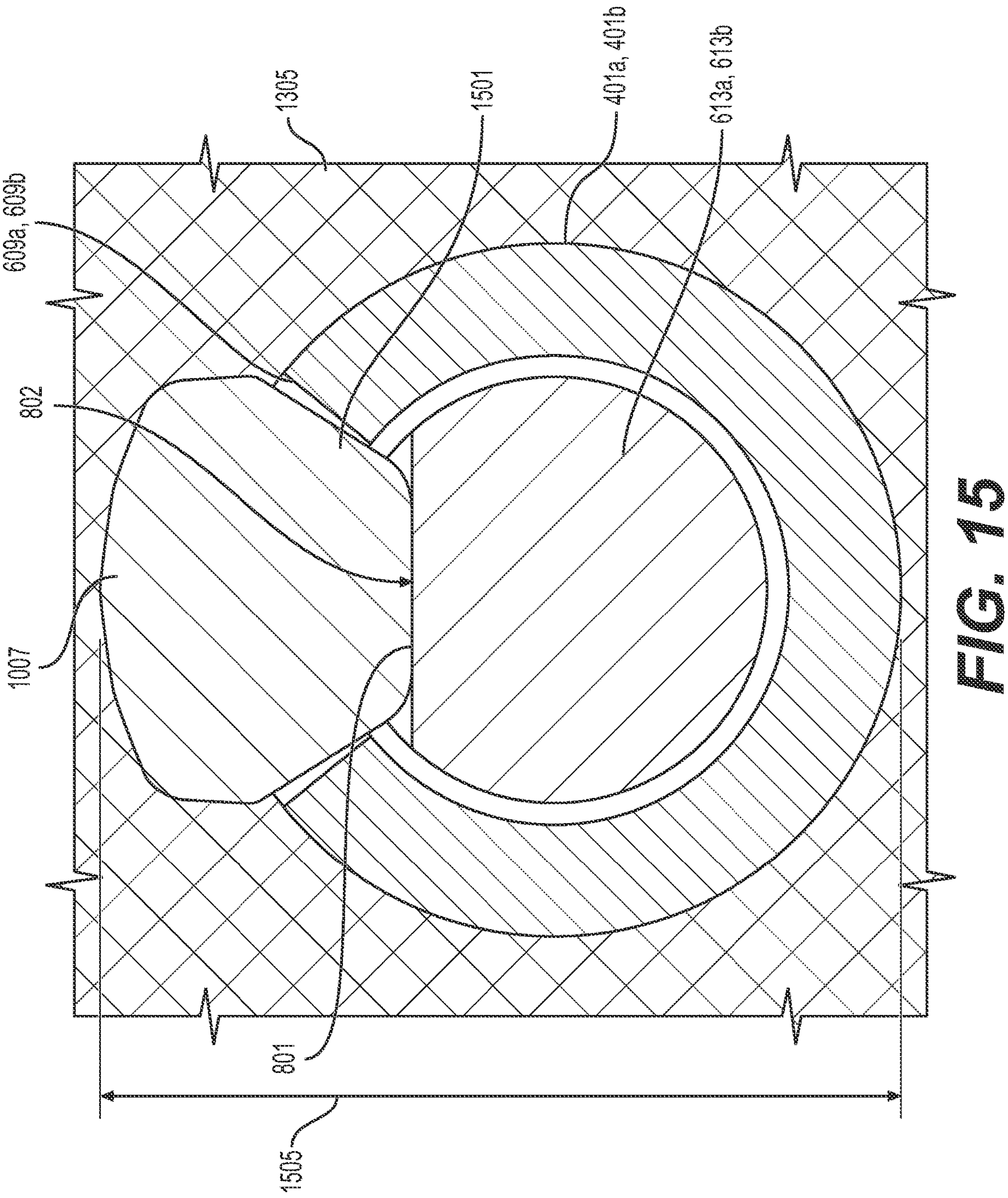
FIG. 15 is a cross-section along line 15-15 of FIG. 14 illustrating the filament of the fastener illustrated in FIG. 10 being received within the recess of one of the ejector pins.
Figure 16:
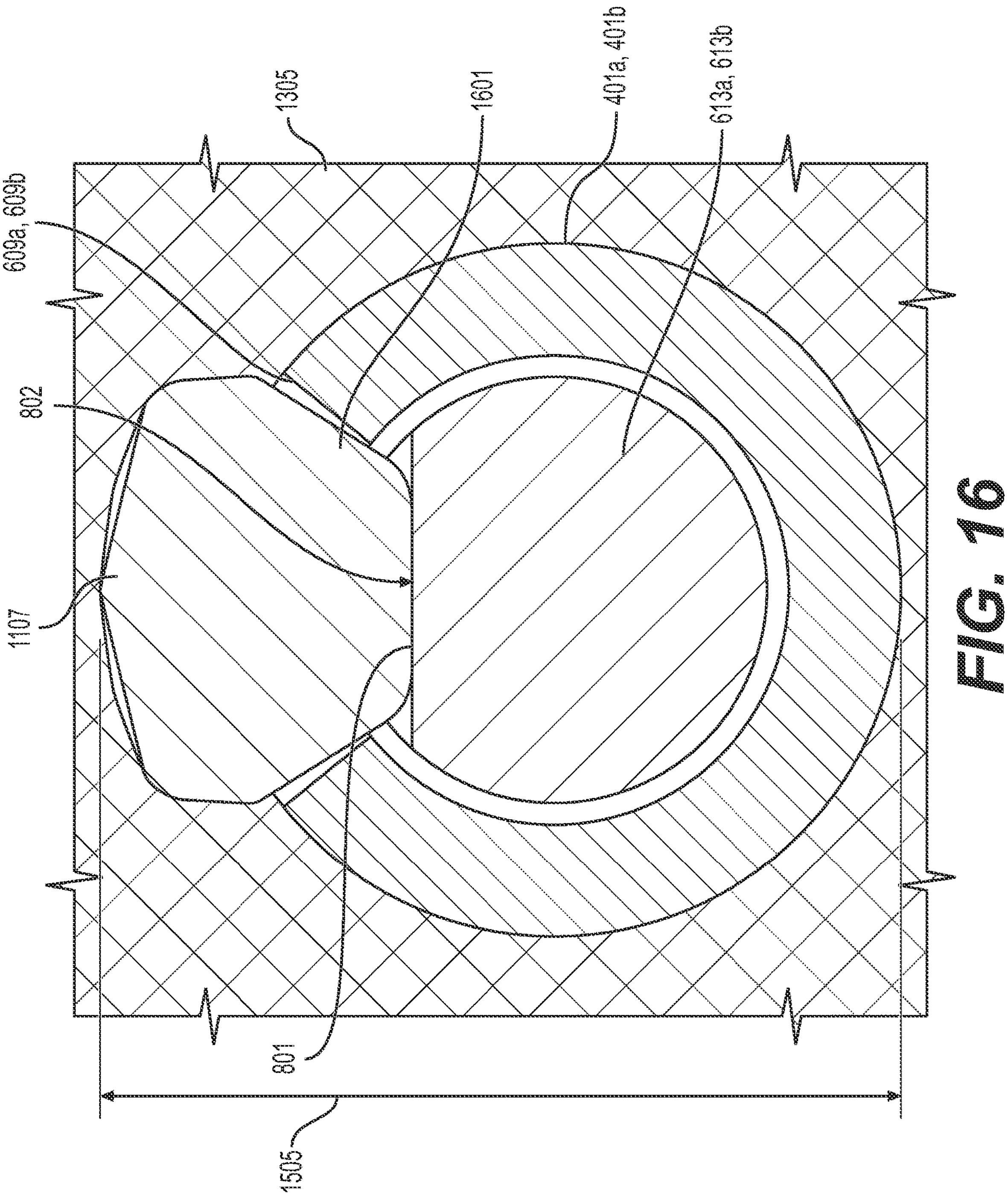
FIG. 16 is a cross-section along line 15-15 of FIG. 14 illustrating the filament of the fastener illustrated in FIG. 11 being received within the recess of one of the ejector pins.

As shown in FIG. 15, the folded over filament 1007 can be pivoted relative to the first and second anchors 1001*a*, 1001*b* such that a portion of the filament 1007 is received within the stepped recess 801 of the outer peripheral surface 615*a*, 615*b* of the first and second ejector pins 613*a*, 613*b*. Similarly, as shown in FIG. 16, the folded over filament 1107 can be pivoted relative to the first and second anchors 1101*a*, 1101*b* such that a portion of the filament 1107 is received within the stepped recess 801 of the outer peripheral surface 615*a*, 615*b* of the first and second ejector pins 613*a*, 613*b*. Indeed, as shown, a wedge-shaped portion 1501 of the filament 1007 (see FIG. 15) and the wedge-shaped portion 1601 of the filament 1107 (see FIG. 16) can be shaped to be received through the slots 609*a*, 609*b* and into the stepped recess 801 and against the flat surface 802. The overall dimension 1505 of the hollow needle with anchor passing through the support structure 1305 can be reduced, thereby reducing the force necessary to be applied by the user to the lever 509 to complete the fastening procedure. The stepped recess 801 allows the filament 1007, 1107 to be folded back (e.g., substantially 90 degrees) relative to the anchors and against the flat surface 802 of the ejector pins 613*a*, 613*b* that prevents the filament 1007, 1107 from being press fit within the hollow needle, thereby reducing the effort necessary for the user to press the lever. Furthermore, if a concave surface were provided instead of the flat surface 802, the overall dimension 1505 may be even further reduced to still further reduce the effort in driving the fastener through the support structure 1305. Thus, the stepped recess 801 of the outer peripheral surface 615*a*, 615*b* of the first and second ejector pins 613*a*, 613*b* provides remarkable beneficial results in reducing the effort necessary to drive the anchors and associated portions of the filament through the support structure 1305 during the fastening procedure.

Figure 17:
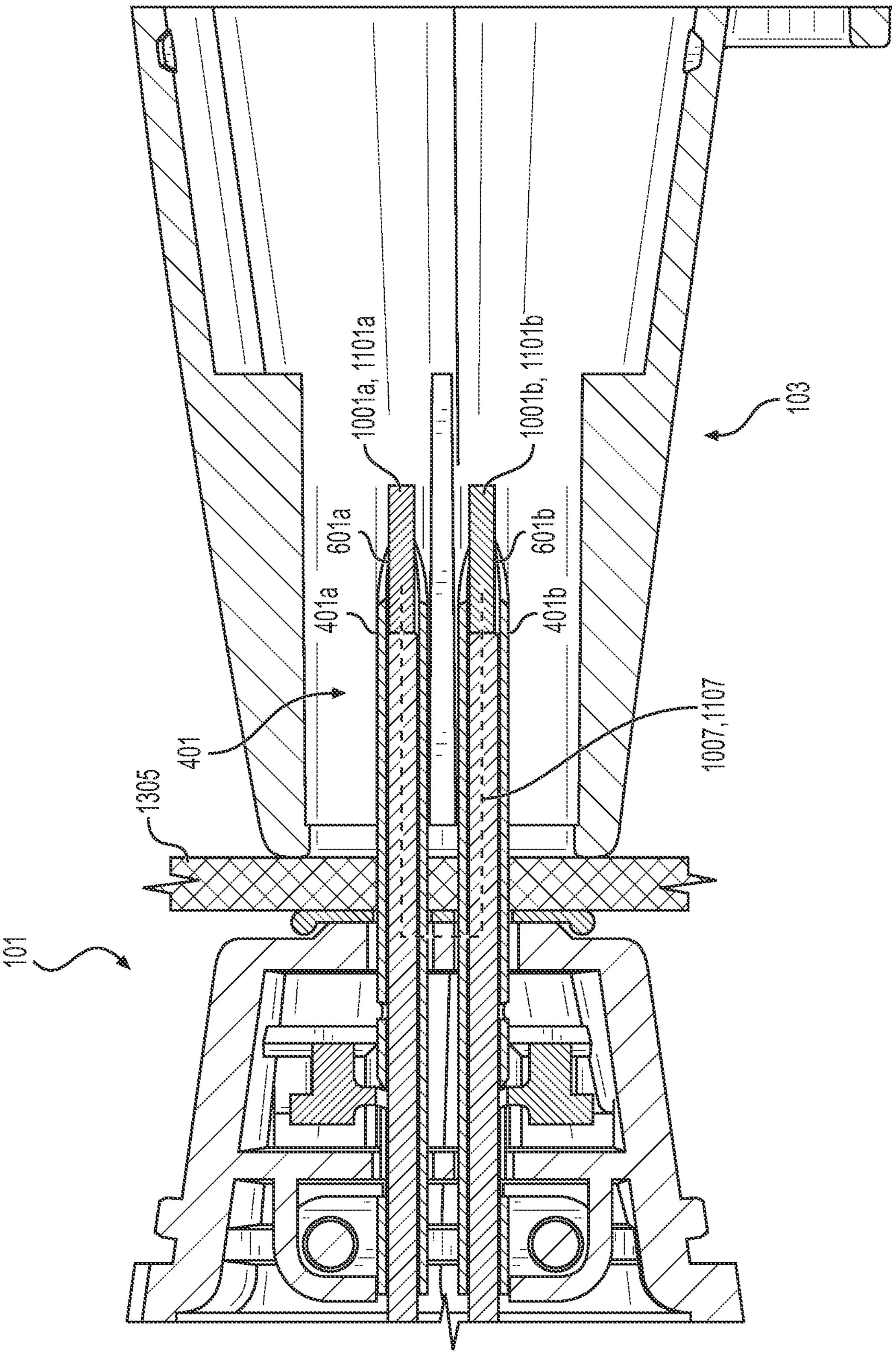
FIG. 17 illustrates the schematic view of FIG. 13 with the ejector pins forcing the anchors one of the fasteners illustrated in FIGS. 10-11 through respective open ends of the hollow needles while increasing a length of the filament of the fastener.

As further shown in FIG. 17, further extension of the ejector pins 613*a*, 613*b* increases the length of the filament 1007, 1107 as schematically shown in FIG. 17 by elastically deforming, plastically deforming or partially elastically and partially plastically deforming the filament 1007, 1107. As shown in FIG. 17, the first anchor 1001*a*, 1101*a* is passed through the first open end 601*a* of the first hollow needle 401*a* with the first ejector pin 613*a* and the second anchor 1001*b*, 1101*b* is passed through the first open end 601*b* of the second hollow needle 401*b* with the second ejector pin 613*b*.

Figure 18:
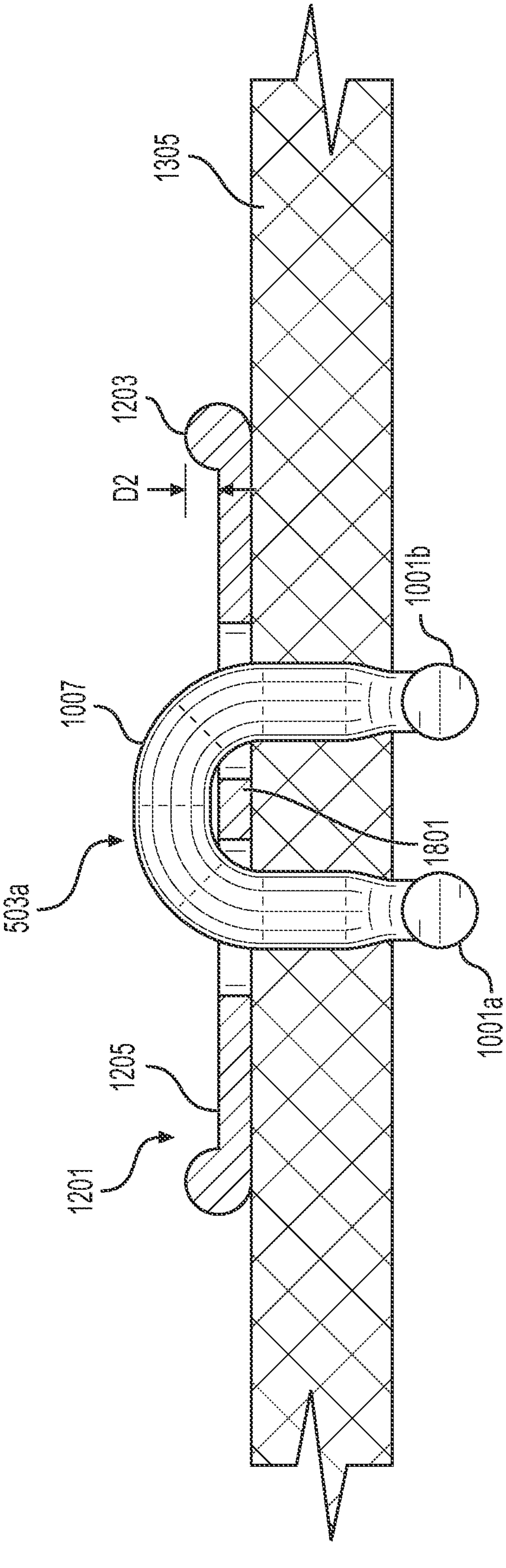
FIG. 18 illustrates a view of the button and fabric of FIG. 17 after the fastener illustrated in FIG. 10 has fastened the button to the fabric.
Figure 19:
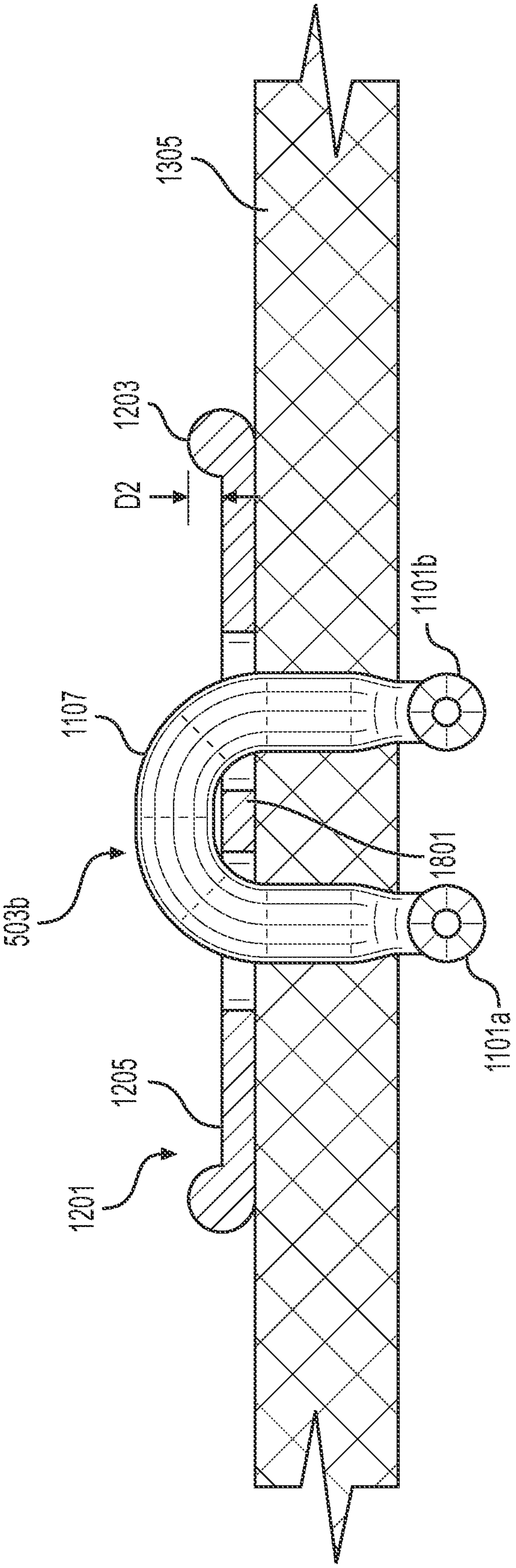
FIG. 19 illustrates a view of the button and fabric of FIG. 17 after the fastener illustrated in FIG. 11 has fastened the button to the fabric

Once the anchors pass through the open ends of the hollow needles, in some embodiments, the filament 1007, 1107 can elastically return to its original length or partially elastically return and the anchors can pivot back to substantially the original orientation where the anchors form T-shaped portions of the fastener, as can be appreciated in FIGS. 18-19, to help prevent the end portions of the filament from passing back through the thickness of the support structure 1305 (e.g., fabric). At the same time, as shown in FIGS. 18-19, the filament 1007, 1107 can pass through the openings in the button 1201 to trap a bridge 1801 of the button, thereby fastening the button 1201 to the support structure 1305. If another fastening operation is desired, the first support rail 1003*a*, 1103*a* and second support rail 1003*b*, 1103*b* can be advanced in order to allow another fastener 503*a*, 503*b* to be deployed by the user in a manner similar or identical to the method discussed above.

The following are example embodiments of the disclosure with the understanding that further example embodiments may be provided in accordance with the disclosure. Furthermore, any of the embodiments discussed below may be used alone or in combination with any of the other embodiments discussed below.

Embodiment 1. An apparatus can comprise a first hollow needle comprising a first open end tapering in an outer direction to a tip, a second open end opposite the first open end, and a slot extending along an axis of first hollow needle at least partially between the first open end and the second open end. The apparatus can further comprise a first ejector pin aligned with the axis of the first hollow needle. The first ejector pin can comprise an outer peripheral surface, a first end portion comprising a first portion of the outer peripheral surface, and a central portion comprising a second portion of the outer peripheral surface. The first portion of the outer peripheral surface can comprise a stepped recess from the second portion of the outer peripheral surface.

Embodiment 2. The apparatus of embodiment 1, wherein the stepped recess can comprise a flat surface extending in a direction of the axis of the first hollow needle.

Embodiment 3. The apparatus of embodiment 1, wherein the stepped recess can comprise a concave surface extending in a direction of the axis of the first hollow needle.

Embodiment 4. The apparatus of any one of embodiments 1-3, wherein the apparatus can further comprise a cap comprising a first end portion, a second end portion opposite the first end portion, and an aperture in communication with an interior area of the cap and extending through an outer surface of the second end portion. The first end portion of the cap can be configured for mounting to a nose of the apparatus with a portion of the first hollow needle positioned within the interior area of the cap while the tip of the first hollow needle is recessed from the outer surface of the second end portion. The aperture can be sized for insertion of the tip of the first hollow needle through the aperture when the cap is removed from the nose.

Embodiment 5. A method of fastening an element to a support structure with the apparatus of any one of embodiments 1-4 can comprise inserting an anchor attached to a first end of a filament into a hollow interior area of the first hollow needle with the filament extending through the slot of the first hollow needle. The method can further comprise piercing a first surface of the support structure with the tip of the first hollow needle such that the tip of the first hollow needle passes through a second surface of the support structure with a portion of the first hollow needle extending through a thickness of the support structure. The method can further comprise passing the anchor through the first open end of the first hollow needle with the first ejector pin, wherein a portion of the filament is pivoted relative to the anchor and positioned within the stepped recess.

Embodiment 6. The apparatus of any one of embodiments 1-3 can further comprise a second hollow needle comprising a first open end tapering in the outer direction to a tip, a second open end opposite the first open end of the second hollow needle, and a slot extending along an axis of the second hollow needle at least partially between the first open end and the second open end of the second hollow needle. The apparatus can still further comprise a second ejector pin aligned with the axis of the second hollow needle. The second ejector pin can comprise an outer peripheral surface, a first end portion comprising a first portion of the outer peripheral surface, and a central portion comprising a second portion of the outer peripheral surface. The first portion of the outer peripheral surface of the second ejector pin can comprise a stepped recess from the second portion of the outer peripheral surface of the second ejector pin.

Embodiment 7. The apparatus of embodiment 6, wherein the stepped recess of the second ejector pin can comprise a flat surface extending in a direction of the axis of the second hollow needle.

Embodiment 8. The apparatus of embodiment 6, wherein the stepped recess of the second ejector pin can comprise a concave surface extending in a direction of the axis of the second hollow needle.

Embodiment 9. The apparatus of any one of embodiments 6-8, wherein the apparatus can further comprise a cap comprising a first end portion, a second end portion opposite the first end portion, and an aperture in communication with an interior area of the cap and extending through an outer surface of the second end portion. The first end portion of the cap can be configured for mounting to a nose of the apparatus with a portion of the first hollow needle and a portion of the second hollow needle positioned within the interior area of the cap. The tip of the first hollow needle and the tip of the second hollow needle can be recessed from the outer surface of the second end portion. The aperture can be sized for insertion of the tip of the first hollow needle and the tip of the second hollow needle through the aperture when the cap is removed from the nose.

Embodiment 10. The apparatus of embodiment 9, wherein the aperture extending through the outer surface of the second end portion of the cap can comprise an oblong aperture.

Embodiment 11. The apparatus of any one of embodiments 6-8, wherein the apparatus can further comprise a nose comprising a first support surface facing the outer direction, and a second support surface facing the outer direction and protruding from the first support surface in the outer direction. The first support surface can radially extend from an outer periphery of the second support surface, and the first hollow needle and the second hollow needle can each extend through the second support surface.

Embodiment 12. A method of fastening an element to a support structure with the apparatus of any one of embodiments 6-8 can comprise inserting a first anchor attached to a first end of a filament into a hollow interior area of the first hollow needle with the filament extending through the slot of the first hollow needle. The method can further comprise inserting a second anchor attached to a second end of the filament into a hollow interior area of the second hollow needle with the filament extending through the slot of the second hollow needle. The method can still further include piercing a first surface of the support structure with the tip of the first hollow needle and the tip of the second hollow needle such that the tip of the first hollow needle and the tip of the second hollow needle each pass through a second surface of the support structure with a portion of the first hollow needle and a portion of the second hollow needle extending through a thickness of the support structure. The method can still further include passing the first anchor through the first open end of the first hollow needle with the first ejector pin, wherein a first portion of the filament is pivoted relative to the first anchor and position within the stepped recess of the outer peripheral surface of the first ejector pin. The method can still further include passing the second anchor through the first open end of the second hollow needle with the second ejector pin, wherein a second portion of the filament is pivoted relative to the second anchor and position within the stepped recess of the outer peripheral surface of the second ejector pin.

Embodiment 13. The method of embodiment 12, wherein the element can comprise a button and, prior to the piercing the first surface of the support structure, further comprising inserting the tip of the first hollow needle through a first hole of the button and inserting the tip of the second hollow needle through a second hole of the button.

Embodiment 14. The method of any one of embodiments 12-13, wherein the support structure can comprise fabric.

Embodiment 15. The method of any one of embodiments 12-14, wherein the method can further comprise increasing a length of the filament.

Embodiment 16. An apparatus can comprise a first hollow needle comprising a first open end tapering in an outer direction to a tip, a second open end opposite the first open end, and a slot extending along an axis of first hollow needle at least partially between first open end and the second open end. The apparatus can further comprise a first ejector pin aligned with the axis of the first hollow needle. The apparatus can further comprise a cap comprising a first end portion, a second end portion opposite the first end portion, and an aperture in communication with an interior area of the cap and extending through an outer surface of the second end portion. The first end portion of the cap can be configured for mounting to a nose of the apparatus with a portion of the first hollow needle positioned within the interior area of the cap while the tip of the first hollow needle is recessed from the outer surface of the second end portion. The aperture can be sized for insertion of the tip of the first hollow needle through the aperture when the cap is removed from the nose.

Embodiment 17. The apparatus of embodiment 16, wherein the aperture extending through the outer surface of the second end portion of the cap can comprise an oblong aperture.

Embodiment 18. A method of fastening an element to a support structure with the apparatus of any one of embodiments 16-17. The method can comprise removing the cap from the nose. The method can further comprise inserting an anchor attached to a first end of a filament into a hollow interior area of the first hollow needle with the filament extending through the slot of the first hollow needle. The method can further comprise piercing a first surface of the support structure with the tip of the first hollow needle such that the tip of the first hollow needle passes through a second surface of the support structure with a portion of the first hollow needle extending through a thickness of the support structure. The method can further comprise inserting the tip of the first hollow needle through the aperture of the cap. The method can further comprise compressing the support structure between the nose and the outer surface of the second end portion of the cap. The method can further comprise passing the anchor through the first open end of the first hollow needle with the first ejector pin while the support structure is compressed between the nose and the outer surface of the second end portion of the cap.

Embodiment 19. The apparatus of embodiment 16, wherein the apparatus can further comprise a second hollow needle comprising a first open end tapering in the outer direction to a tip, a second open end opposite the first open end of the second hollow needle, and a slot extending along an axis of the second hollow needle at least partially between the first open end and the second open end of the second hollow needle. The apparatus can further comprise a second ejector pin aligned with the axis of the second hollow needle. The first end portion of the cap can be further configured for mounting to the nose of the apparatus with the portion of the first hollow needle and a portion of the second hollow needle positioned within the interior area of the cap while the tip of the first hollow needle and the tip of the second hollow needle are recessed from the outer surface of the second end portion. The aperture can be sized for insertion of the tip of the first hollow needle and the tip of the second hollow needle through the aperture when the cap is removed from the nose.

Embodiment 20. The apparatus of embodiment 19, wherein the aperture extending through the outer surface of the second end portion of the cap can comprise an oblong aperture.

Embodiment 21. The apparatus of any one of embodiments 19-20, wherein the nose can further comprise a first support surface facing the outer direction, and a second support surface facing the outer direction and protruding from the first support surface in the outer direction. The first support surface can radially extend from an outer periphery of the second support surface. The first hollow needle and the second hollow needle can each extend through the second support surface.

Embodiment 22. A method of fastening an element to a support structure with the apparatus of any one of embodiments 19-21 can comprise removing a cap from the nose. The method can further comprise inserting a first anchor attached to a first end of a filament into a hollow interior area of the first hollow needle with the filament extending through the slot of the first hollow needle. The method can further comprise inserting a second anchor attached to a second end of the filament into a hollow interior area of the second hollow needle with the filament extending through the slot of the second hollow needle. The method can further comprise piercing a first surface of the support structure with the tip of the first hollow needle and the tip of the second hollow needle such that the tip of the first hollow needle and the tip of the second hollow needle each pass through a second surface of the support structure with a portion of the first hollow needle and a portion of the second hollow needle extending through a thickness of the support structure. The method can further include inserting the tip of the first hollow needle and the tip of the second hollow needle through the aperture of the cap. The method can further include compressing the support structure between the nose and the outer surface of the second end portion of the cap. The method can further include passing the first anchor through the first open end of the first hollow needle with the first ejector pin and passing the second anchor through the first open end of the second hollow needle with the second ejector pin while the support structure is compressed between the nose and the outer surface of the second end portion of the cap.

Embodiment 23. The method of embodiment 22, wherein the element can comprise a button and, prior to the piercing the first surface of the support structure, the method can further comprise inserting the tip of the first hollow needle through a first hole of the button and inserting the tip of the second hollow needle through a second hole of the button.

Embodiment 24. The method of any one of embodiments 22-23, wherein the support structure can comprise fabric.

Embodiment 25. The method of any one of embodiments 22-24, wherein the method can further comprise increasing a length of the filament.

Embodiment 26. An apparatus can comprise a nose comprising a first support surface facing an outer direction and a second support surface facing the outer direction and protruding from the first support surface in the outer direction. The first support surface can radially extend from an outer periphery of the second support surface. A first hollow needle can extend through the second support surface. The first hollow needle can comprise a first open end tapering in the outer direction to a tip, a second open end opposite the first open end, and a slot extending along an axis of first hollow needle at least partially between the first open end and the second open end. The apparatus can further comprise a second hollow needle extending through the second support surface. The second hollow needle can comprise a first open end tapering in the outer direction to a tip, a second open end opposite the first open end of the second hollow needle, and a slot extending along an axis of the second hollow needle at least partially between the first open end and the second open end of the second hollow needle.

Embodiment 27. The apparatus of embodiment 26, wherein the first support surface can circumscribe the outer periphery of the second support surface.

Embodiment 28. The apparatus of any one of embodiments 26-27, wherein the apparatus can further comprise a first ejector pin aligned with the axis of the first hollow needle. The first ejector pin can comprise an outer peripheral surface, a first end portion comprising a first portion of the outer peripheral surface, and a central portion comprising a second portion of the outer peripheral surface. The first portion of the outer peripheral surface can comprise a stepped recess from the second portion of the outer peripheral surface. The apparatus can further comprise a second ejector pin aligned with the axis of the second hollow needle. The second ejector pin can comprise an outer peripheral surface, a first end portion comprising a first portion of the outer peripheral surface, and a central portion comprising a second portion of the outer peripheral surface. The first portion of the outer peripheral surface of the second ejector pin can comprise a stepped recess from the second portion of the outer peripheral surface of the second ejector pin.

Embodiment 29. The apparatus of any one of embodiments 26-28, wherein the apparatus can further comprise a cap comprising a first end portion, a second end portion opposite the first end portion, and an aperture in communication with an interior area of the cap and extending through an outer surface of the second end portion. The first end portion of the cap can be configured for mounting to the nose with a portion of the first hollow needle and a portion of the second hollow needle positioned within the interior area of the cap. The tip of the first hollow needle and the tip of the second hollow needle can be recessed from the outer surface of the second end portion. The aperture can be sized for insertion of the tip of the first hollow needle and the tip of the second hollow needle through the aperture when the cap is removed from the nose.

Embodiment 30. The apparatus of embodiment 29, wherein the aperture extending through the outer surface of the second end portion of the cap can comprise an oblong aperture.

Embodiment 31. A method of fastening a button to a support structure with the apparatus of any one of embodiments 26-30 can comprise inserting the tip of the first hollow needle through a first hole of the button and inserting the tip of the second hollow needle through a second hole of the button. The method can further comprise pressing the button against the nose with the second support surface positioned within a cavity of the button.

It should be understood that while various embodiments have been described in detail with respect to certain illustrative and specific examples thereof, the present disclosure should not be considered limited to such, as numerous modifications and combinations of the disclosed features are possible without departing from the scope of the following claims.

What is claimed is:

1. An apparatus comprising:

a first hollow needle comprising a first open end tapering in an outer direction to a tip, a second open end opposite the first open end, and a slot extending along an axis of first hollow needle at least partially between the first open end and the second open end; and a first ejector pin aligned with the axis of the first hollow needle, the first ejector pin comprising an outer peripheral surface, a first end portion comprising a first portion of the outer peripheral surface, and a central portion comprising a second portion of the outer peripheral surface, wherein the first portion of the outer peripheral surface comprises a stepped recess from the second portion of the outer peripheral surface.

2. The apparatus of claim 1, wherein the stepped recess comprises a flat surface extending in a direction of the axis of the first hollow needle.

3. The apparatus of claim 1, wherein the stepped recess comprises a concave surface extending in a direction of the axis of the first hollow needle.

4. The apparatus of claim 1, further comprising a cap comprising a first end portion, a second end portion opposite the first end portion, and an aperture in communication with an interior area of the cap and extending through an outer surface of the second end portion, wherein the first end portion of the cap is configured for mounting to a nose of the apparatus with a portion of the first hollow needle positioned within the interior area of the cap while the tip of the first hollow needle is recessed from the outer surface of the second end portion, and wherein the aperture is sized for insertion of the tip of the first hollow needle through the aperture when the cap is removed from the nose.

5. A method of fastening an element to a support structure with the apparatus of claim 1 comprising:

inserting an anchor attached to a first end of a filament into a hollow interior area of the first hollow needle with the filament extending through the slot of the first hollow needle;

piercing a first surface of the support structure with the tip of the first hollow needle such that the tip of the first hollow needle passes through a second surface of the support structure with a portion of the first hollow needle extending through a thickness of the support structure; and passing the anchor through the first open end of the first hollow needle with the first ejector pin, wherein a portion of the filament is pivoted relative to the anchor and positioned within the stepped recess.

6. The apparatus of claim 1 further comprising:

a second hollow needle comprising a first open end tapering in the outer direction to a tip, a second open end opposite the first open end of the second hollow needle, and a slot extending along an axis of the second hollow needle at least partially between the first open end and the second open end of the second hollow needle; and a second ejector pin aligned with the axis of the second hollow needle, the second ejector pin comprising an outer peripheral surface, a first end portion comprising a first portion of the outer peripheral surface, and a central portion comprising a second portion of the outer peripheral surface, wherein the first portion of the outer peripheral surface of the second ejector pin comprises a stepped recess from the second portion of the outer peripheral surface of the second ejector pin.

7. The apparatus of claim 6, wherein the stepped recess of the second ejector pin comprises a flat surface extending in a direction of the axis of the second hollow needle.

8. The apparatus of claim 6, wherein the stepped recess of the second ejector pin comprises a concave surface extending in a direction of the axis of the second hollow needle.

9. The apparatus of claim 6 further comprising a cap comprising a first end portion, a second end portion opposite the first end portion, and an aperture in communication with an interior area of the cap and extending through an outer surface of the second end portion, wherein the first end portion of the cap is configured for mounting to a nose of the apparatus with a portion of the first hollow needle and a portion of the second hollow needle positioned within the interior area of the cap, and the tip of the first hollow needle and the tip of the second hollow needle recessed from the outer surface of the second end portion, and wherein the aperture is sized for insertion of the tip of the first hollow needle and the tip of the second hollow needle through the aperture when the cap is removed from the nose.

10. The apparatus of claim 9, wherein the aperture extending through the outer surface of the second end portion of the cap comprises an oblong aperture.

11. The apparatus of claim 6 further comprising a nose comprising a first support surface facing the outer direction, a second support surface facing the outer direction and protruding from the first support surface in the outer direction, the first support surface radially extends from an outer periphery of the second support surface, and the first hollow needle and the second hollow needle each extends through the second support surface.

12. A method of fastening an element to a support structure with the apparatus of claim 6 comprising:

inserting a first anchor attached to a first end of a filament into a hollow interior area of the first hollow needle with the filament extending through the slot of the first hollow needle;

inserting a second anchor attached to a second end of the filament into a hollow interior area of the second hollow needle with the filament extending through the slot of the second hollow needle;

piercing a first surface of the support structure with the tip of the first hollow needle and the tip of the second hollow needle such that the tip of the first hollow needle and the tip of the second hollow needle each pass through a second surface of the support structure with a portion of the first hollow needle and a portion of the second hollow needle extending through a thickness of the support structure;

passing the first anchor through the first open end of the first hollow needle with the first ejector pin, wherein a first portion of the filament is pivoted relative to the first anchor and position within the stepped recess of the outer peripheral surface of the first ejector pin; and passing the second anchor through the first open end of the second hollow needle with the second ejector pin, wherein a second portion of the filament is pivoted relative to the second anchor and position within the stepped recess of the outer peripheral surface of the second ejector pin.

13. The method of claim 12, wherein the element comprises a button and, prior to the piercing the first surface of the support structure, further comprising inserting the tip of the first hollow needle through a first hole of the button and inserting the tip of the second hollow needle through a second hole of the button.

14. The method of claim 12, wherein the support structure comprises fabric.

15. The method of claim 12, further comprising increasing a length of the filament.

16. An apparatus comprising:

a first hollow needle comprising a first open end tapering in an outer direction to a tip, a second open end opposite the first open end, and a slot extending along an axis of first hollow needle at least partially between first open end and the second open end;

a first ejector pin aligned with the axis of the first hollow needle; and a cap comprising a first end portion, a second end portion opposite the first end portion, and an aperture in communication with an interior area of the cap and extending through an outer surface of the second end portion, wherein the first end portion of the cap is configured for mounting to a nose of the apparatus with a portion of the first hollow needle positioned within the interior area of the cap while the tip of the first hollow needle is recessed from the outer surface of the second end portion, and wherein the aperture is sized for insertion of the tip of the first hollow needle through the aperture when the cap is removed from the nose.

17. The apparatus of claim 16, wherein the aperture extending through the outer surface of the second end portion of the cap comprises an oblong aperture.

18. A method of fastening an element to a support structure with the apparatus of claim 16, comprising:

removing the cap from the nose;

inserting an anchor attached to a first end of a filament into a hollow interior area of the first hollow needle with the filament extending through the slot of the first hollow needle;

piercing a first surface of the support structure with the tip of the first hollow needle such that the tip of the first hollow needle passes through a second surface of the support structure with a portion of the first hollow needle extending through a thickness of the support structure;

inserting the tip of the first hollow needle through the aperture of the cap;

compressing the support structure between the nose and the outer surface of the second end portion of the cap; and passing the anchor through the first open end of the first hollow needle with the first ejector pin while the support structure is compressed between the nose and the outer surface of the second end portion of the cap.

19. The apparatus of claim 16, further comprising:

a second hollow needle comprising a first open end tapering in the outer direction to a tip, a second open end opposite the first open end of the second hollow needle, and a slot extending along an axis of the second hollow needle at least partially between the first open end and the second open end of the second hollow needle;

a second ejector pin aligned with the axis of the second hollow needle; and the first end portion of the cap further configured for mounting to the nose of the apparatus with the portion of the first hollow needle and a portion of the second hollow needle positioned within the interior area of the cap while the tip of the first hollow needle and the tip of the second hollow needle are recessed from the outer surface of the second end portion, and wherein the aperture is sized for insertion of the tip of the first hollow needle and the tip of the second hollow needle through the aperture when the cap is removed from the nose.

20. The apparatus of claim 19, wherein the aperture extending through the outer surface of the second end portion of the cap comprises an oblong aperture.

21. The apparatus of claim 19, wherein the nose further comprises a first support surface facing the outer direction, a second support surface facing the outer direction and protruding from the first support surface in the outer direction, the first support surface radially extends from an outer periphery of the second support surface, and the first hollow needle and the second hollow needle each extends through the second support surface.

22. A method of fastening an element to a support structure with the apparatus of claim 19, comprising:

removing a cap from the nose;

inserting a first anchor attached to a first end of a filament into a hollow interior area of the first hollow needle with the filament extending through the slot of the first hollow needle;

inserting a second anchor attached to a second end of the filament into a hollow interior area of the second hollow needle with the filament extending through the slot of the second hollow needle;

piercing a first surface of the support structure with the tip of the first hollow needle and the tip of the second hollow needle such that the tip of the first hollow needle and the tip of the second hollow needle each pass through a second surface of the support structure with a portion of the first hollow needle and a portion of the second hollow needle extending through a thickness of the support structure;

inserting the tip of the first hollow needle and the tip of the second hollow needle through the aperture of the cap;

compressing the support structure between the nose and the outer surface of the second end portion of the cap; and passing the first anchor through the first open end of the first hollow needle with the first ejector pin and passing the second anchor through the first open end of the second hollow needle with the second ejector pin while the support structure is compressed between the nose and the outer surface of the second end portion of the cap.

23. The method of claim 22, wherein the element comprises a button and, prior to the piercing the first surface of the support structure, further comprising inserting the tip of the first hollow needle through a first hole of the button and inserting the tip of the second hollow needle through a second hole of the button.

24. The method of claim 22, wherein the support structure comprises fabric.

25. The method of claim 22, further comprising increasing a length of the filament.

26. An apparatus comprising:

a nose comprising a first support surface facing an outer direction and a second support surface facing the outer direction and protruding from the first support surface in the outer direction, wherein the first support surface radially extends from an outer periphery of the second support surface;

a first hollow needle extending through the second support surface, the first hollow needle comprising a first open end tapering in the outer direction to a tip, a second open end opposite the first open end, and a slot extending along an axis of first hollow needle at least partially between the first open end and the second open end; and a second hollow needle extending through the second support surface, the second hollow needle comprising a first open end tapering in the outer direction to a tip, a second open end opposite the first open end of the second hollow needle, and a slot extending along an axis of the second hollow needle at least partially between the first open end and the second open end of the second hollow needle.

27. The apparatus of claim 26, wherein the first support surface circumscribes the outer periphery of the second support surface.

28. The apparatus of claim 26, further comprising:

a first ejector pin aligned with the axis of the first hollow needle, the first ejector pin comprising an outer peripheral surface, a first end portion comprising a first portion of the outer peripheral surface, and a central portion comprising a second portion of the outer peripheral surface, wherein the first portion of the outer peripheral surface comprises a stepped recess from the second portion of the outer peripheral surface; and a second ejector pin aligned with the axis of the second hollow needle, the second ejector pin comprising an outer peripheral surface, a first end portion comprising a first portion of the outer peripheral surface, and a central portion comprising a second portion of the outer peripheral surface, wherein the first portion of the outer peripheral surface of the second ejector pin comprises a stepped recess from the second portion of the outer peripheral surface of the second ejector pin.

29. The apparatus of claim 26, further comprising a cap comprising a first end portion, a second end portion opposite the first end portion, and an aperture in communication with an interior area of the cap and extending through an outer surface of the second end portion, wherein the first end portion of the cap is configured for mounting to the nose with a portion of the first hollow needle and a portion of the second hollow needle positioned within the interior area of the cap, and the tip of the first hollow needle and the tip of the second hollow needle recessed from the outer surface of the second end portion, and wherein the aperture is sized for insertion of the tip of the first hollow needle and the tip of the second hollow needle through the aperture when the cap is removed from the nose.

30. The apparatus of claim 29, wherein the aperture extending through the outer surface of the second end portion of the cap comprises an oblong aperture.

31. A method of fastening a button to a support structure with the apparatus of claim 26 comprising:

inserting the tip of the first hollow needle through a first hole of the button;

inserting the tip of the second hollow needle through a second hole of the button; and pressing the button against the nose with the second support surface positioned within a cavity of the button.

* * * * *